(12) United States Patent
Yamauchi et al.

(10) Patent No.: US 6,259,480 B1
(45) Date of Patent: Jul. 10, 2001

(54) SEQUENTIAL SCANNING CONVERTER

(75) Inventors: Hideaki Yamauchi; Yoshio Seki, both of Osaka; Tomohisa Tagami, Habikino, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/089,249

(22) Filed: Jun. 2, 1998

(30) Foreign Application Priority Data

Jun. 2, 1997 (JP) ..................................... 9-143603

(51) Int. Cl.[7] .................................................. H04N 7/01
(52) U.S. Cl. ............................................. 348/452; 348/448
(58) Field of Search .................................. 348/448, 452, 348/458, 557, 571, 700; 382/299

(56) References Cited

U.S. PATENT DOCUMENTS

| | | | |
|---|---|---|---|
| 4,403,250 | * | 9/1983 | Kellar ..................................... 358/105 |
| 4,679,084 | * | 7/1987 | Topper et al. ......................... 358/160 |
| 4,761,686 | * | 8/1988 | Willis .................................... 358/160 |
| 4,967,271 | * | 10/1990 | Campbell et al. ................... 358/105 |
| 5,534,935 | * | 7/1996 | Kawai et al. ......................... 348/448 |
| 5,625,421 | * | 4/1997 | Faroudja et al. ..................... 348/607 |

* cited by examiner

Primary Examiner—Victor R. Kostak
(74) Attorney, Agent, or Firm—Ratner & Prestia

(57) ABSTRACT

The invention includes an interpolation circuit for generating interpolation scanning lines by averaging adjacent scanning lines from an interlaced input video signal. Also included is a motion detecting circuit for detecting the amount of motion of the input video signal. The output signal of the interpolation circuit is connected to an amplitude control circuit controlled by the amount of motion from the motion detecting circuit. The input video signal terminal and the output terminal of the amplitude control circuit are connected to a converter circuit which performs time division multiplexing of the interlaced input video scanning lines and interpolation scanning lines by using a clock 2fH from a control signal input terminal. The clock has a frequency which is two times the horizontal scanning frequency. The motion detecting circuit detects the amount of motion and if the amount of motion is small, amplitude control of the interpolation scanning lines is not-performed. If the amount of motion is large, control is performed in the amplitude control circuit to provide an amplitude difference between the real scanning lines and the interpolation scanning lines.

23 Claims, 20 Drawing Sheets

42 : Adder

43 : Multiplier

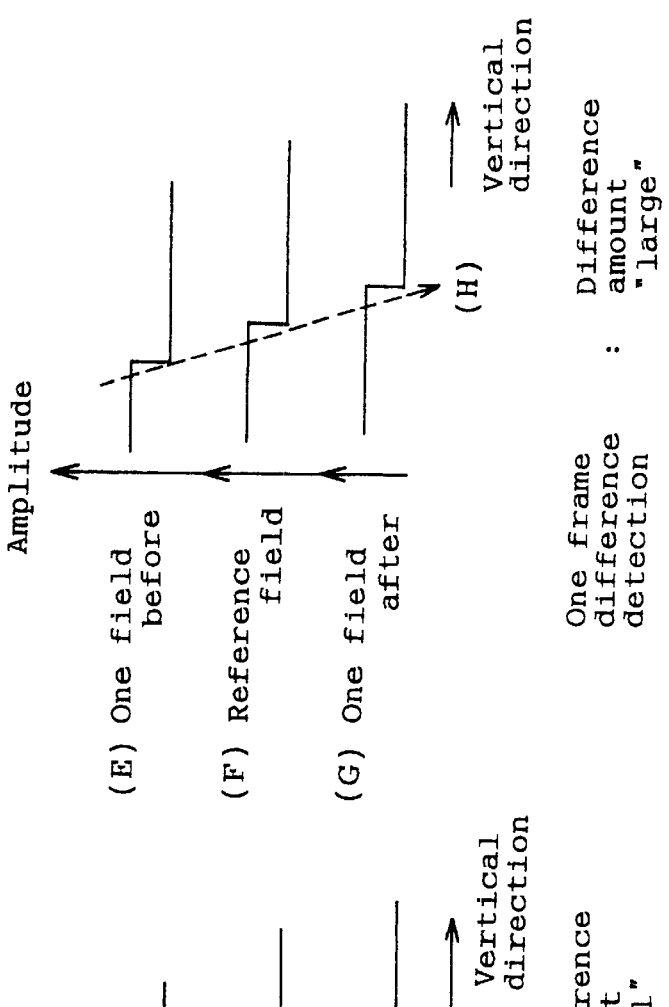
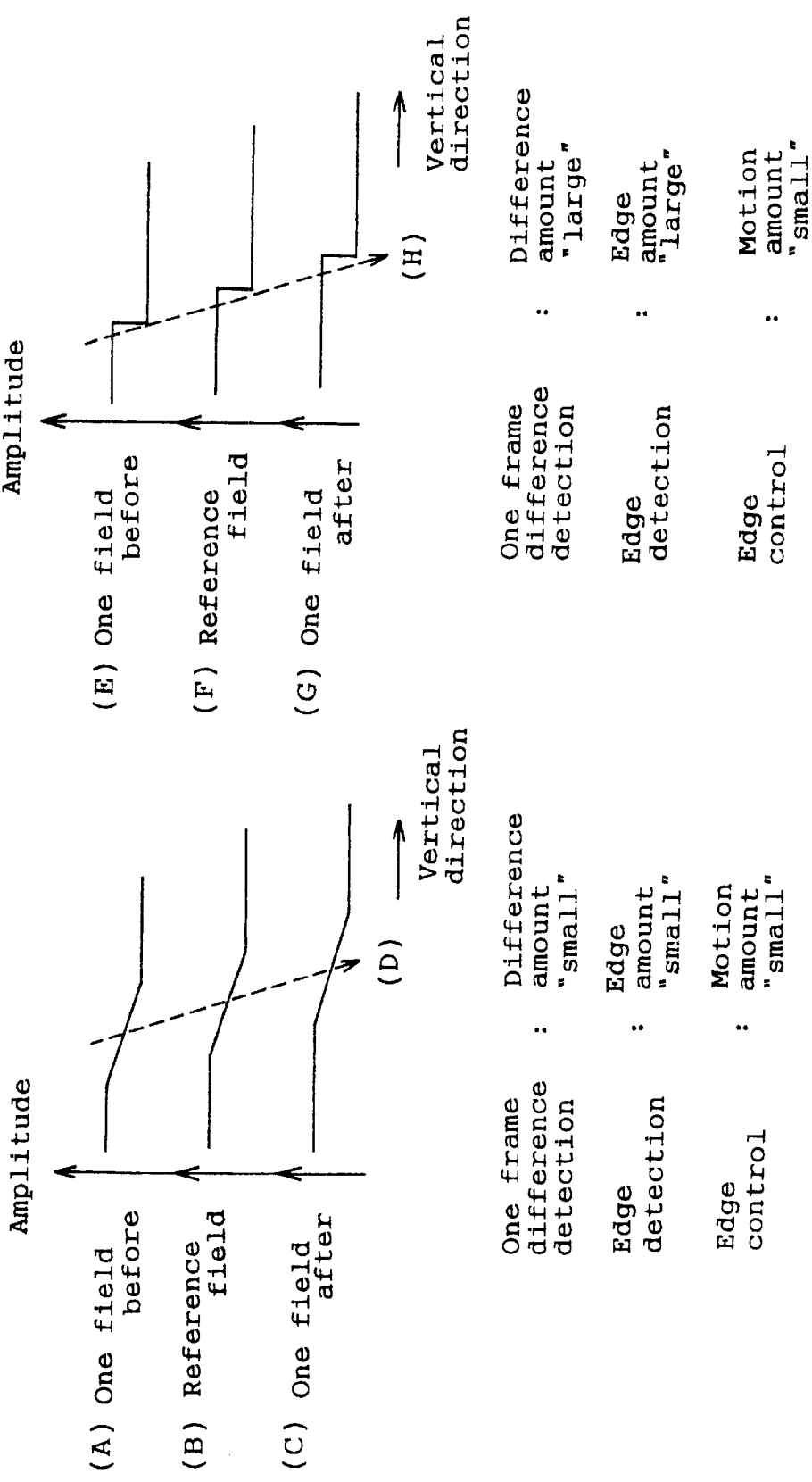

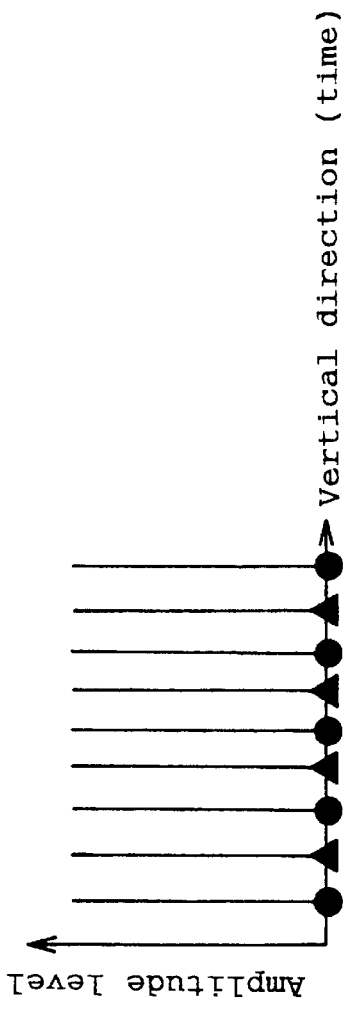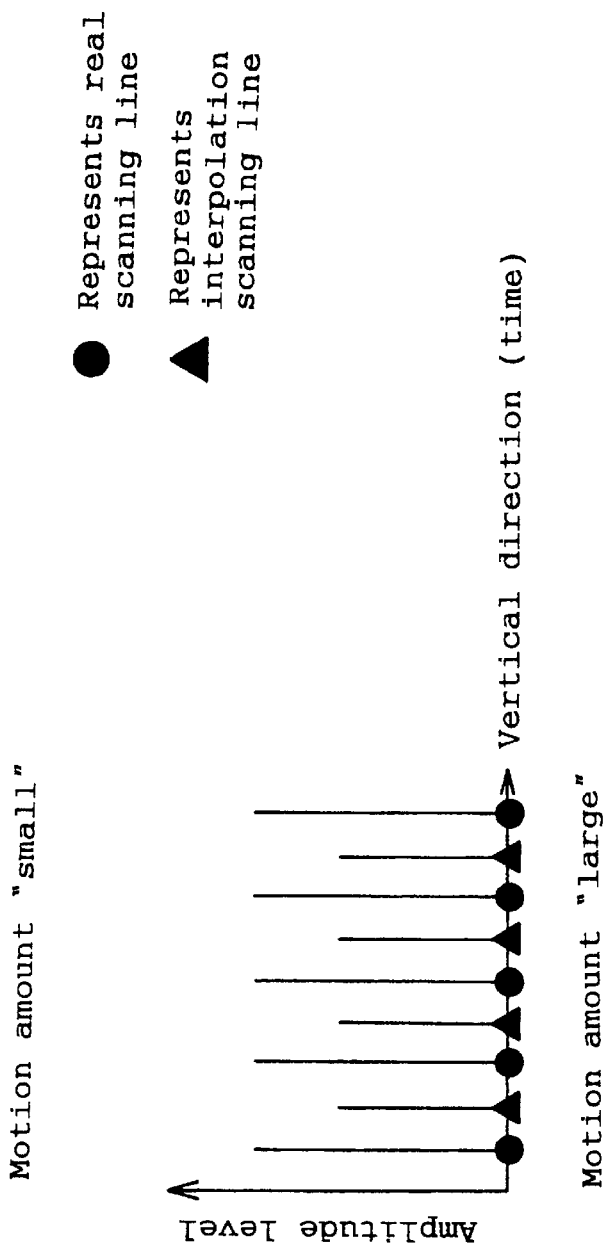
Fig. 6(a)
Fig. 6(b)

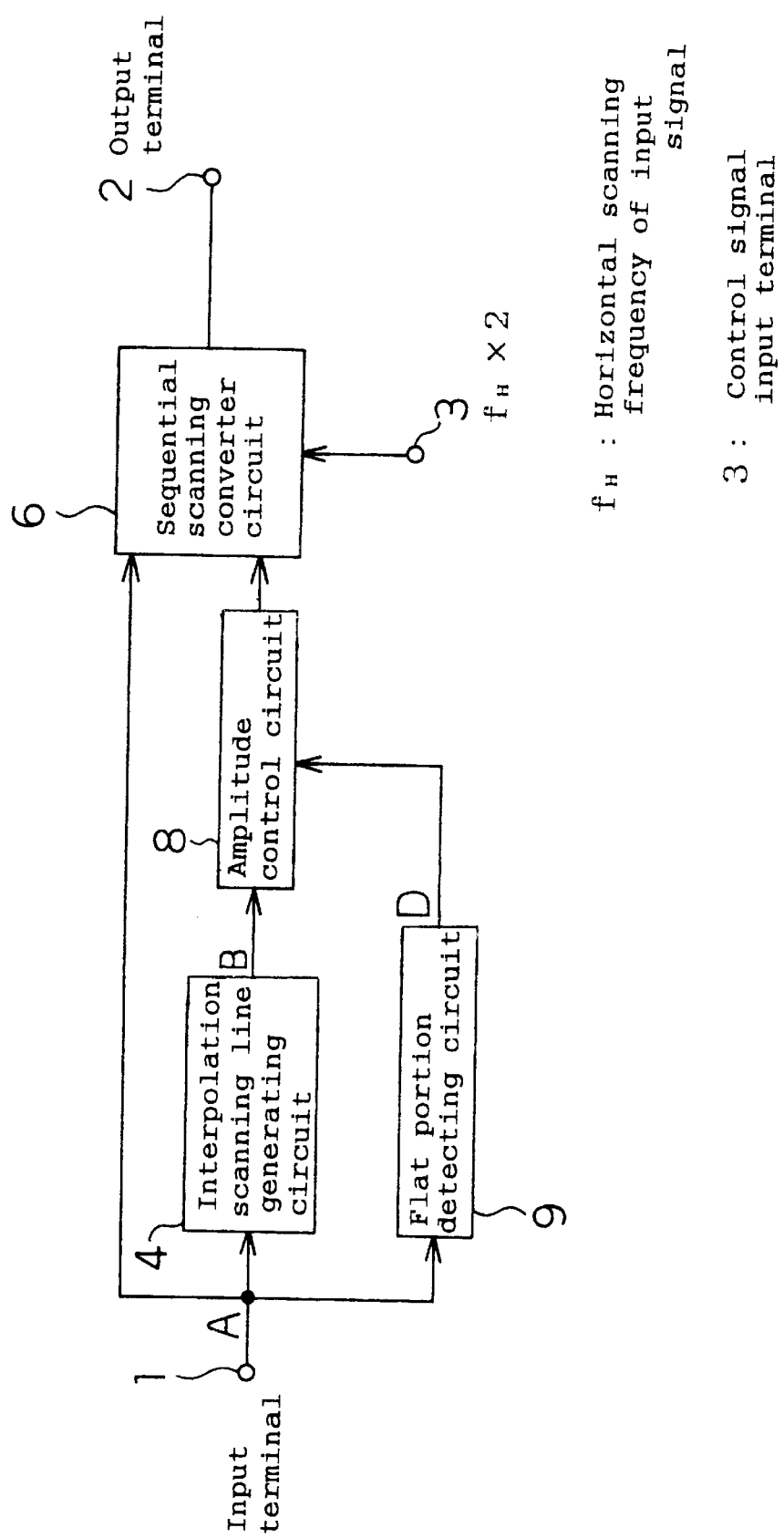

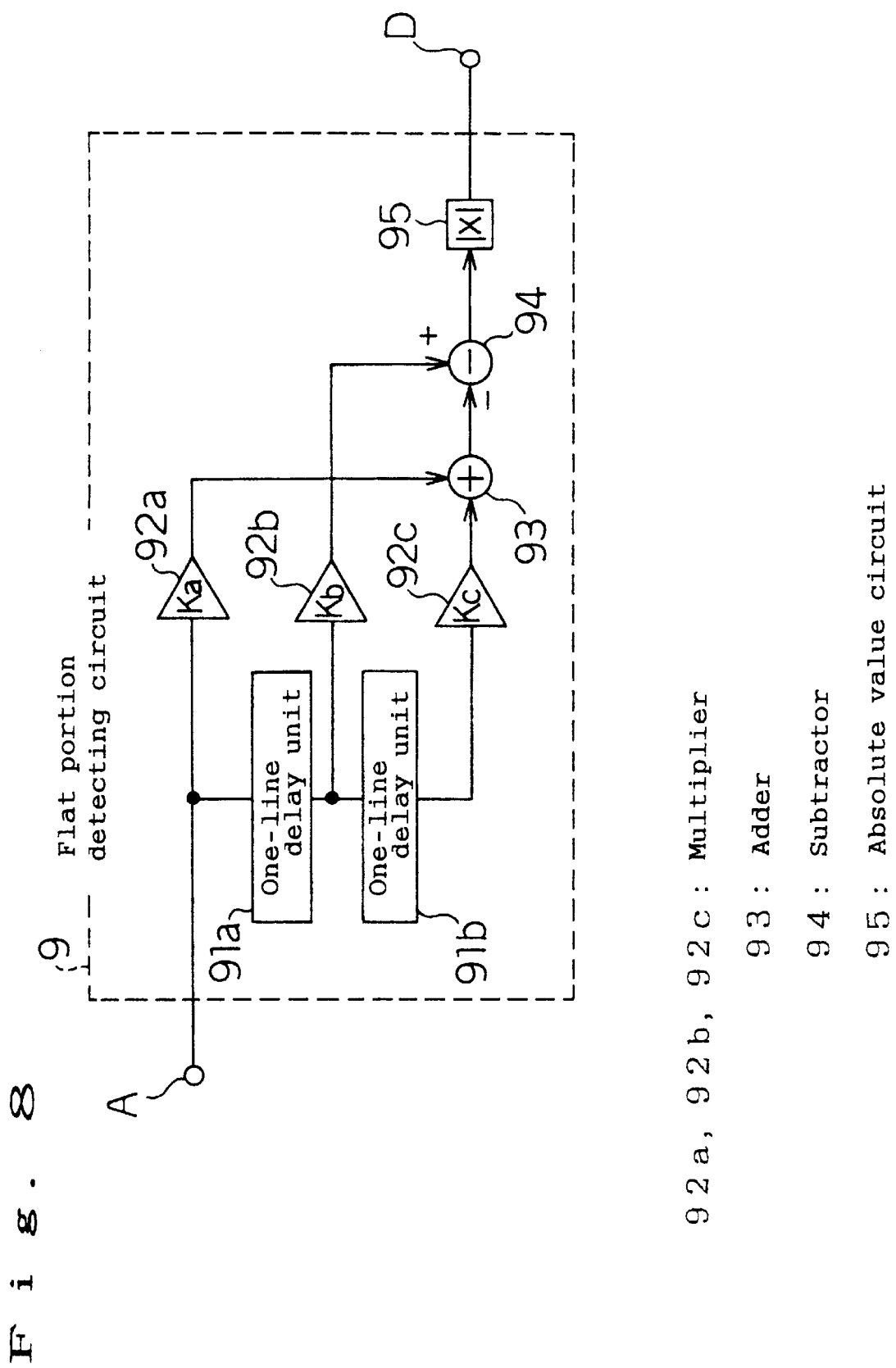

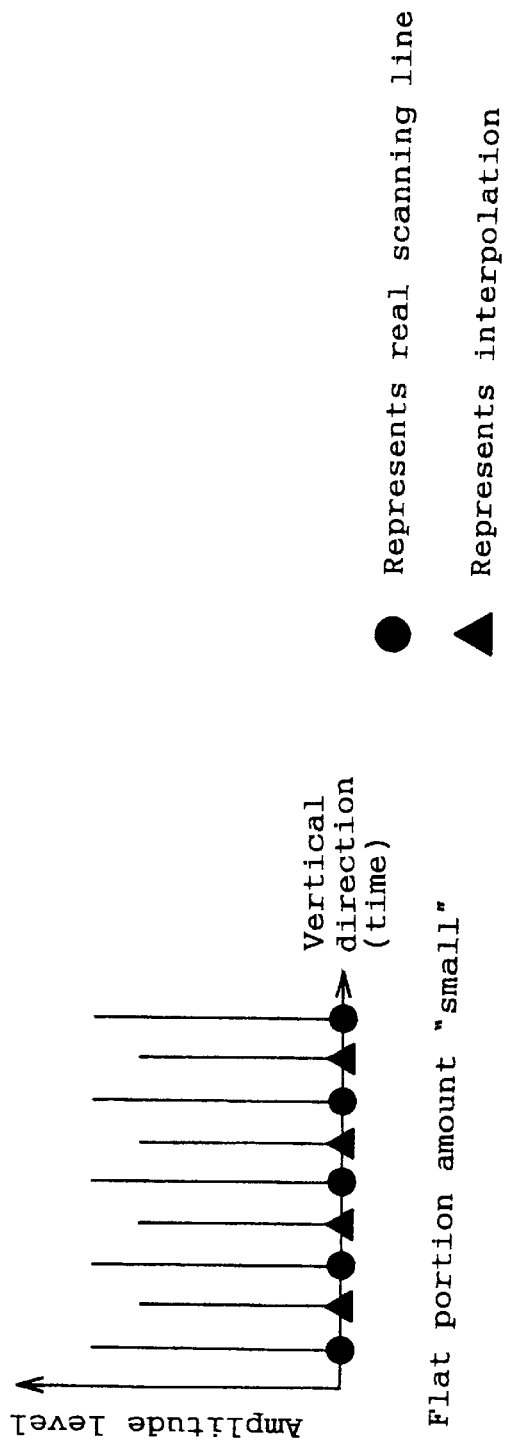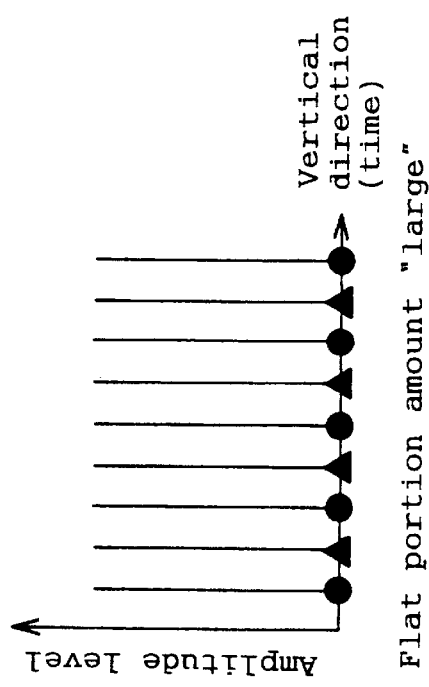

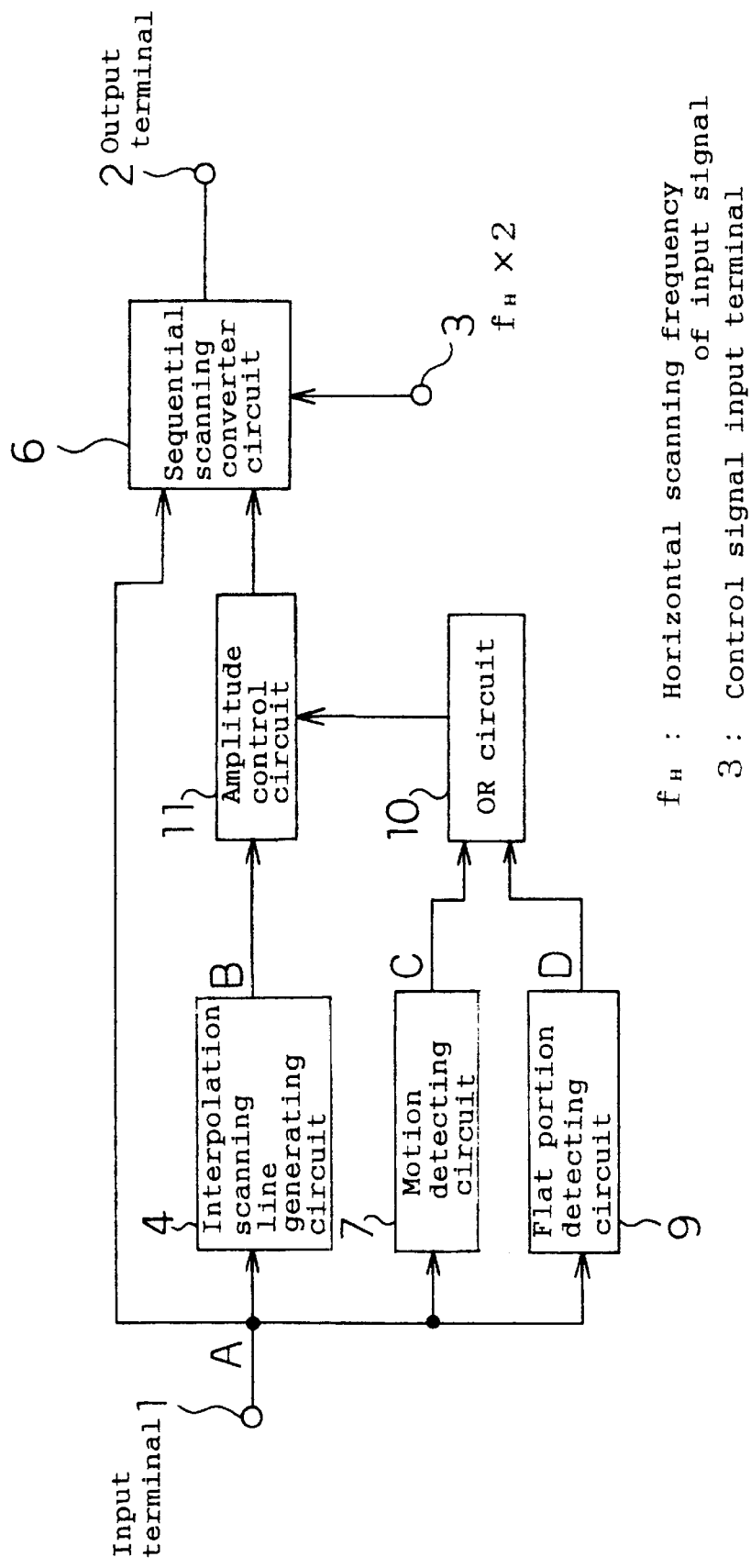

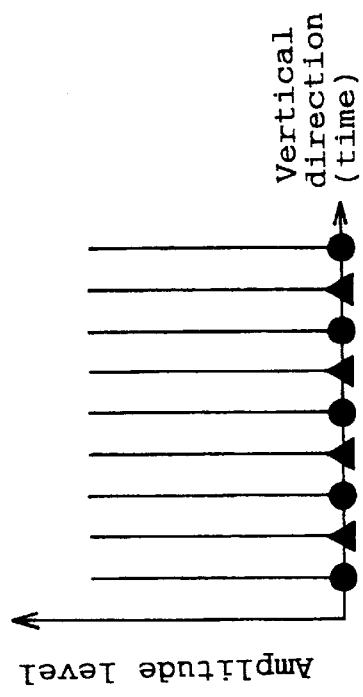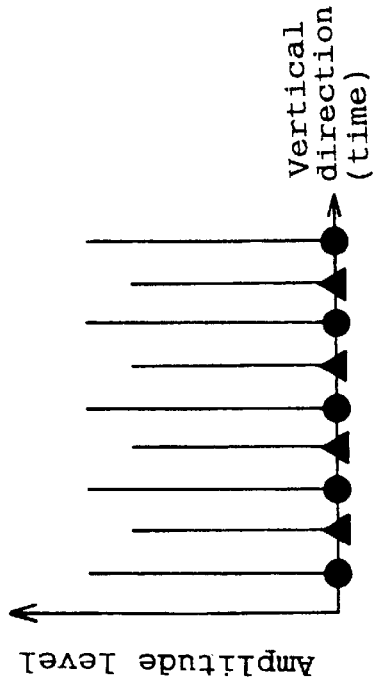

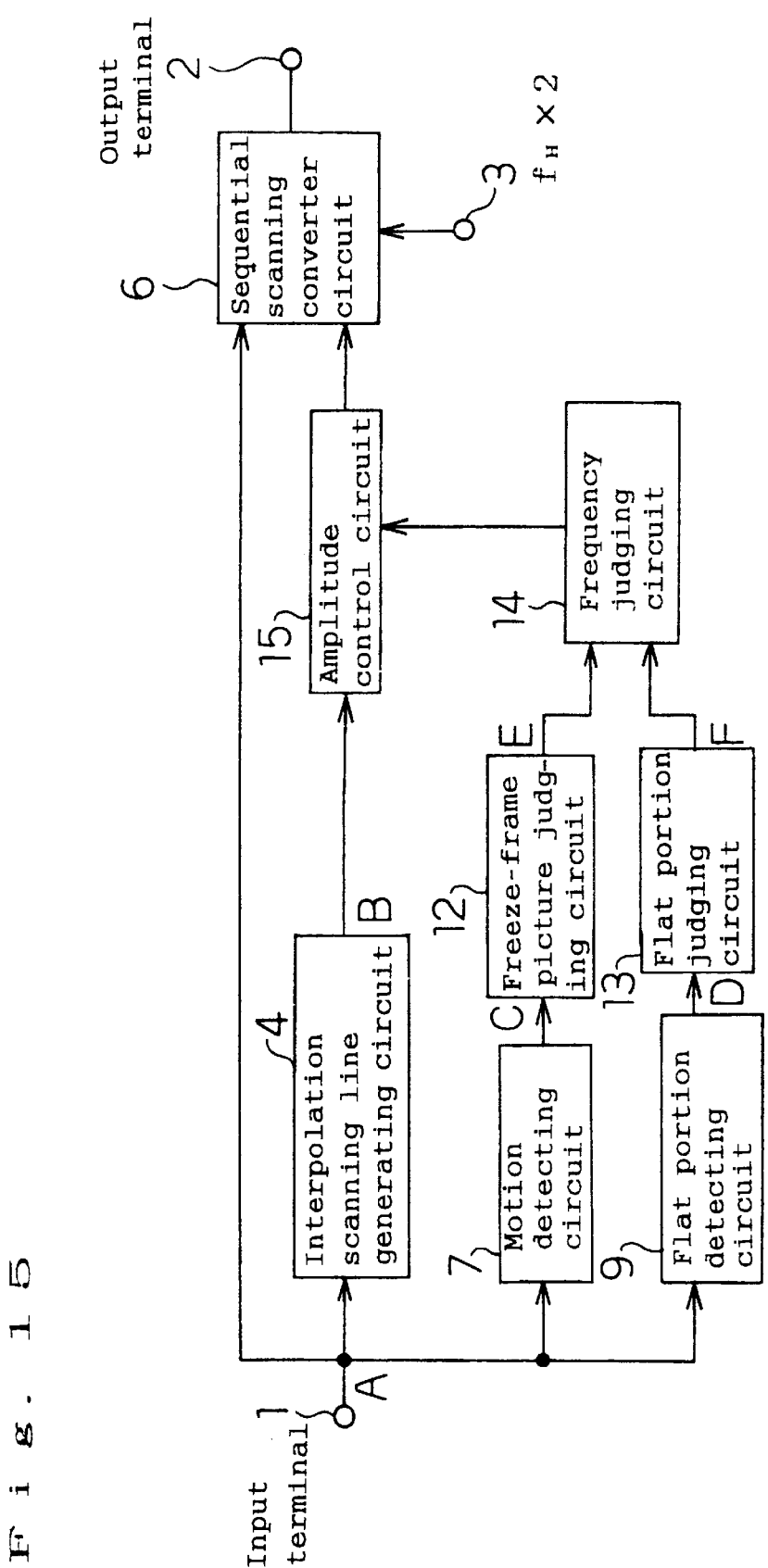

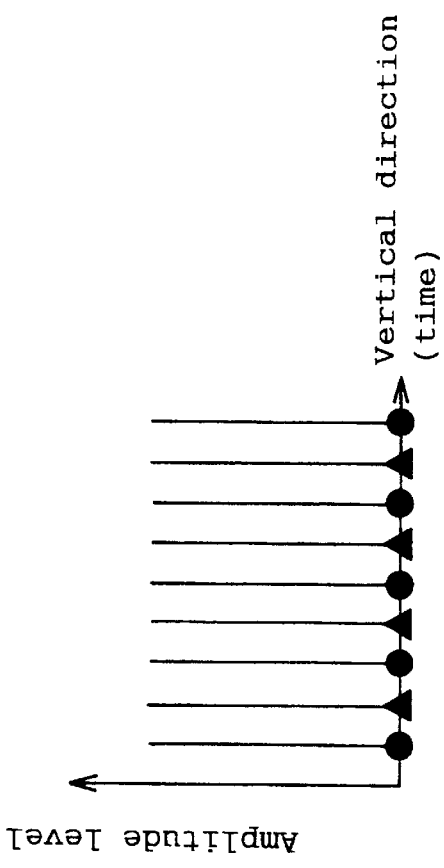
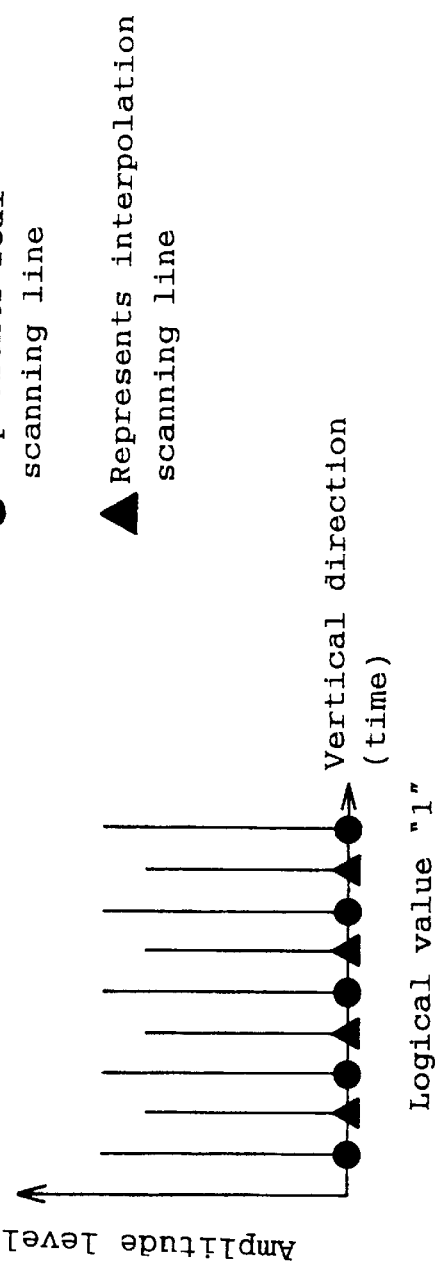

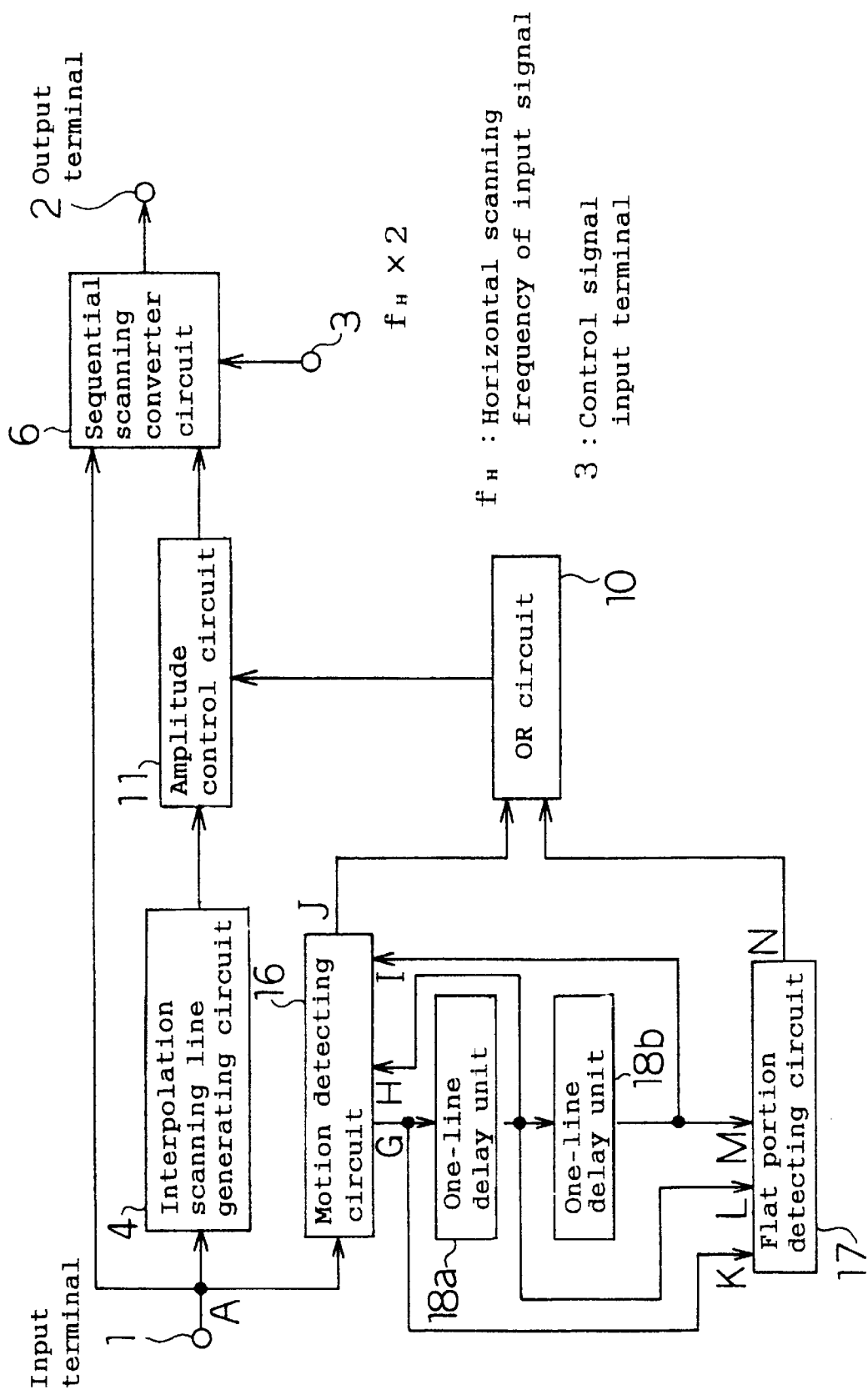

163a, 163b, 163c : Subtractor
164a, 164b, 164c : Absolute value circuit
166 : Maximum value detecting circuit
171a, 171b, 171c : Multiplier
172 : Adder
173 : Subtractor
174 : Absolute value circuit

SEQUENTIAL SCANNING CONVERTER

BACKGROUND OF THE INVENTION

1. Field of the Invention

The present invention relates to a sequential scanning converter for converting a picture signal of interlaced scanning to a sequential scanning scheme by scanning line interpolation, and displaying it, and particularly, to a sequential scanning converter which improves the picture quality degradation caused by scanning conversion.

2. Related Art of the Invention

The current television-system employs an interlaced scanning scheme. In the interlaced scanning scheme, two fields, odd and even fields, form one frame. Thus, for instance, in the HDTV system, the number of scanning lines per frame is 1,125, but, if the viewing distance becomes short, the coarse scanning line structure forming each field becomes visible, causing degradation in the picture quality.

As a method for improving the scanning line structure, there is a scheme in which a video signal is interpolated between the upper and lower scanning lines in a field so as to be converted to the sequential scanning, but the frame made by this has a problem that the sharpness of the vertical direction decreases to affect the picture quality.

As a conventional sequential scanning converter, to solve the above problem, for instance, a sequential scanning converter for improving the picture quality degradation due to the sequential scanning by simple two scans through controlling the brightness of the interpolation signal for sequential scanning according to the brightness of the picture signal (for instance, "Sequential Scanning Converter Circuit," "Japanese Patent Application Laid-Open No. 63-179685), or a sequential scanning converter for preventing apparent degradation of the sharpness by decreasing the amplitude of the interpolation signal after sequential conversion (for instance," "Television Display of Clearvision System," "Japanese Patent Application Laid-Open No. 4-95479)" was filed.

However, in the above conventional arrangement, a quasi-interlace effect is obtained by decreasing the amplitude-of interpolation lines in the conversion to the sequential scanning as compared with the amplitude of real lines, thereby to enable an apparent increase in the sharpness of the vertical direction, but, it has a problem that, since there is a difference between the amplitudes of real and interpolation lines for a signal having no gradation such as an animation created by computer graphics (hereinafter referred to as CG), the occurrence of streaks greatly degrades the picture quality. In particular, the picture quality degradation becomes remarkable as the screen becomes larger and larger in recent years.

SUMMARY OF THE INVENTION

The present invention is to solve the above traditional problem, and it Is the object of it to provide a sequential scanning converter for playing back a natural picture while holding the sharpness, and faithfully playing back a picture having no gradation such as an animation created by CG or the like.

To accomplish the above object, the first-invention comprises:

an interpolation scanning line generating means for generating interpolation scanning lines from an input video signal;

a motion detecting means for detecting the motion amount of the input video signal;

an amplitude control means for controlling the amplitude of the output signal of the interpolation scanning line generating means according to the output of the motion detecting means; and a sequential scanning converting means for performing the conversion to a sequential scanning signal by using the input video signal and the output of the amplitude control means.

The second invention comprises:

an interpolation scanning line generating means for generating interpolation scanning lines from an input video signal;

a flat portion detecting means for detecting the flat portion of the input video signal;

an amplitude control means for controlling the amplitude of the output signal of the interpolation scanning line generating means according to the output signal of the flat portion detecting means; and a sequential scanning converting means for performing the conversion to a sequential scanning signal by using the input video signal and the output signal from the amplitude control means.

The third invention comprises:

an interpolation scanning line generating means for generating interpolation scanning lines from an input video signal; a motion detecting means for detection the motion amount of the input video signal;

a flat portion detecting means for detecting the flat portion of the input view signal;

a judging means for making a judgment with the output signal of the motion detecting means and the output signal of the flat portion detecting means;

an amplitude control means for controlling the amplitude of the output signal of the interpolation scanning line generating means according to the output signal of the judging means; and a sequential scanning converting means for performing the conversion to a sequential scanning signal by using the input video signal and the output signal from the amplitude control means.

The fourth invention comprises:

an interpolation scanning line generating means for generating interpolation scanning lines from an input video signal;

a motion detecting means for detecting the motion amount of the input video signal;

a freeze-frame picture judging means for judging the freeze-frame picture in a field from the output signal of the motion detecting means;

a flat portion detecting means for detecting the flat portion of the input video signal;

a flat portion judging means for judging the flat portion in a field from the output signal of the flat portion detecting means;

a frequency judging means for detecting the freeze-frame picture of at least one field and the frequency of the flat portion from the output signal of the freeze-frame picture judging means and the output signal of the flat portion judging means;

an amplitude control means for controlling the amplitude of the output signal of the interpolation scanning line generating means according to the output signal of the frequency judging means; and a sequential scanning converting means for performing the conversion to a sequential scanning signal by using the input view signal and the output signal from the amplitude control means.

The fifth invention constructed so that the group of scanning line delays in the high-frequency extraction means in the flat portion detecting means is shared by the group of scanning line delay means in the motion detecting means.

BRIEF DESCRIPTION OF THE DRAWINGS

[FIG. 4] A characteristic diagram for explaining the operation of the motion detecting circuit in the same embodiment 1.

[FIG. 6] An output characteristic diagram of the sequential scanning converter in the same embodiment.

[FIG. 7] A block diagram of the sequential scanning converter in an embodiment 2 of the present invention.

[FIG. 8] A block diagram of the flat portion detecting circuit in the same embodiment 2.

[FIG. 11] An output characteristic diagram of the sequential scanning converter in the same embodiment 2.

[FIG. 12] A block diagram of the sequential scanning converter in an embodiment 3 of the present invention.

[FIG. 14] An output characteristic diagram of the sequential scanning converter in the same embodiment 3.

[FIG. 15] A block diagram of the sequential scanning converter in an embodiment 4 of the present invention.

[FIG. 20] An output characteristic diagram of the sequential scanning converter in the same embodiment 4.

[FIG. 21] A block diagram of the sequential scanning converter in an embodiment 5 of the present invention.

DESCRIPTION OF SYMBOLS

Figure 1:
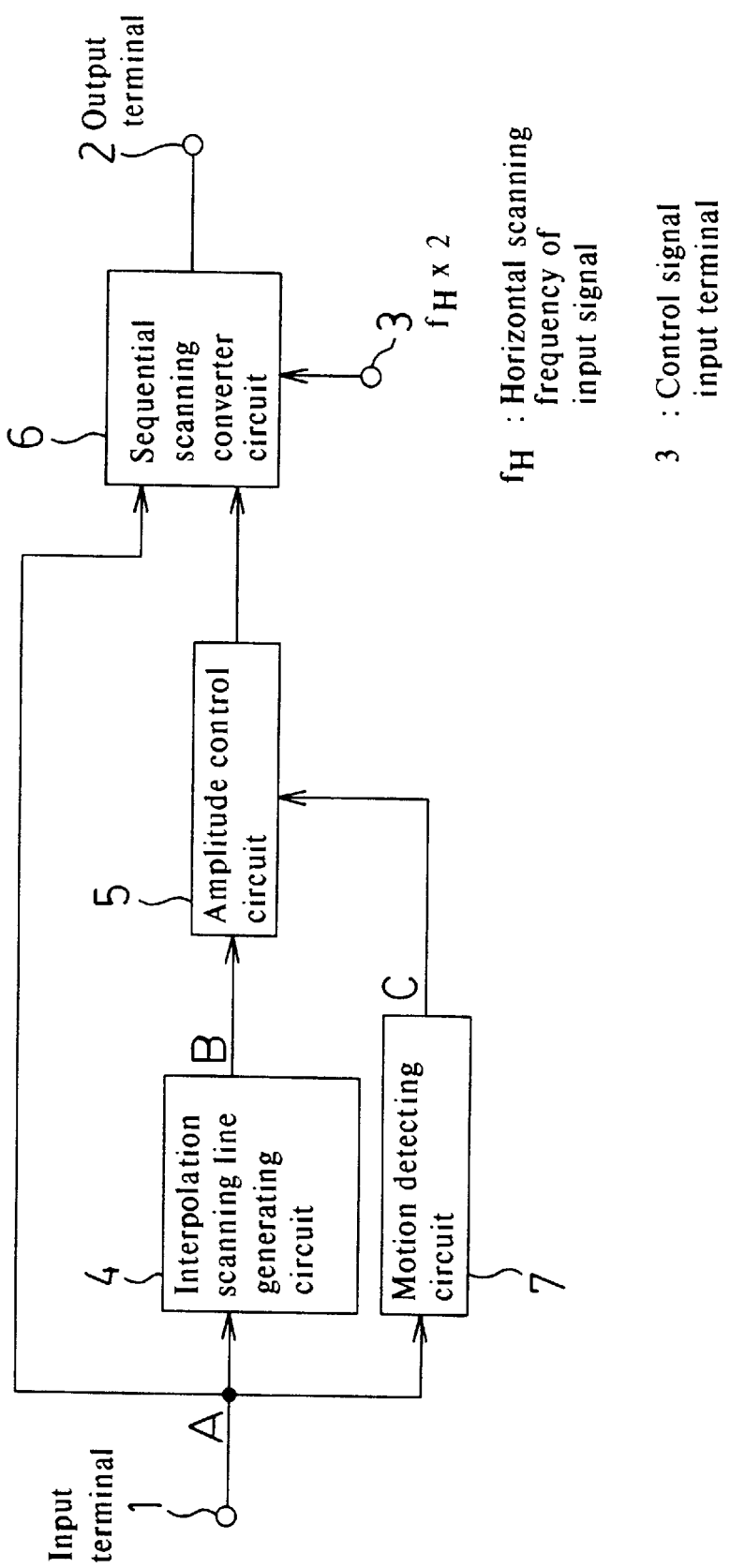
[FIG. 1] A block diagram of the sequential scanning converter in an embodiment 1 of the present invention.

3 Control signal input terminal
4 Interpolation scanning line generating circuit
5, 8, 11, 15 Amplitude control circuits
6 Sequential scanning converter circuit
7, 16 Motion detecting circuits
9, 17 Flat portion detecting circuits
10 OR circuit
12 Freeze-frame picture judging circuit
13 Flat portion judging circuit
14 Frequency judging circuit
41a, 41b, 76a, 76b, 91a, 91b One-line delay units
18a, 18b One-line delay units
42, 93, 172 Adders
43, 92a, 92b, 92c, 171a, 171b, 171c Multipliers
71, 161 One-frame difference detecting circuits
72a, 72b, 162a, 162b One-field delay units
73a, 73b, 73c, 94, 163a, 163b, 163c, 173 Subtractors
74a, 74b, 74c, 95, 164a, 164b, 164c, 174 Absolute value circuits
75, 165 Edge detecting circuits
77, 166 Maximum value detecting circuits
78, 167 Edge control circuits
121, 131 Count circuits

PREFERRED EMBODIMENTS

Now, the embodiments of the present invention are described using FIGS. 1 to 22.

(Embodiment 1)

FIG. 1 is a block diagram showing the construction of the sequential scanning converter of the first embodiment. In FIG. 1, an input terminal 1 to which a video signal is inputted is connected to an interpolation scanning line generating circuit 4 for generating interpolation scanning lines by averaging adjacent scanning lines, and a motion detecting circuit 7 for detection in the motion amount of the input video signal. The output terminal of the interpolation scanning line generating circuit 4 is connected to an amplitude control circuit 5, which is controlled by the motion amount from the motion detecting circuit 7. The input terminal 1 and the output terminal of the amplitude control circuit 5 are connected to a sequential scanning line converter circuit 6, which performs the time division multiplexing of real scanning lines and interpolation scanning lines by using a clock 2fH from a control signal input terminal 3, the frequency of which is two times a horizontal frequency fH. The output terminal of the sequential scanning line converter circuit 6 is connected to an output terminal 2.

Figure 2:
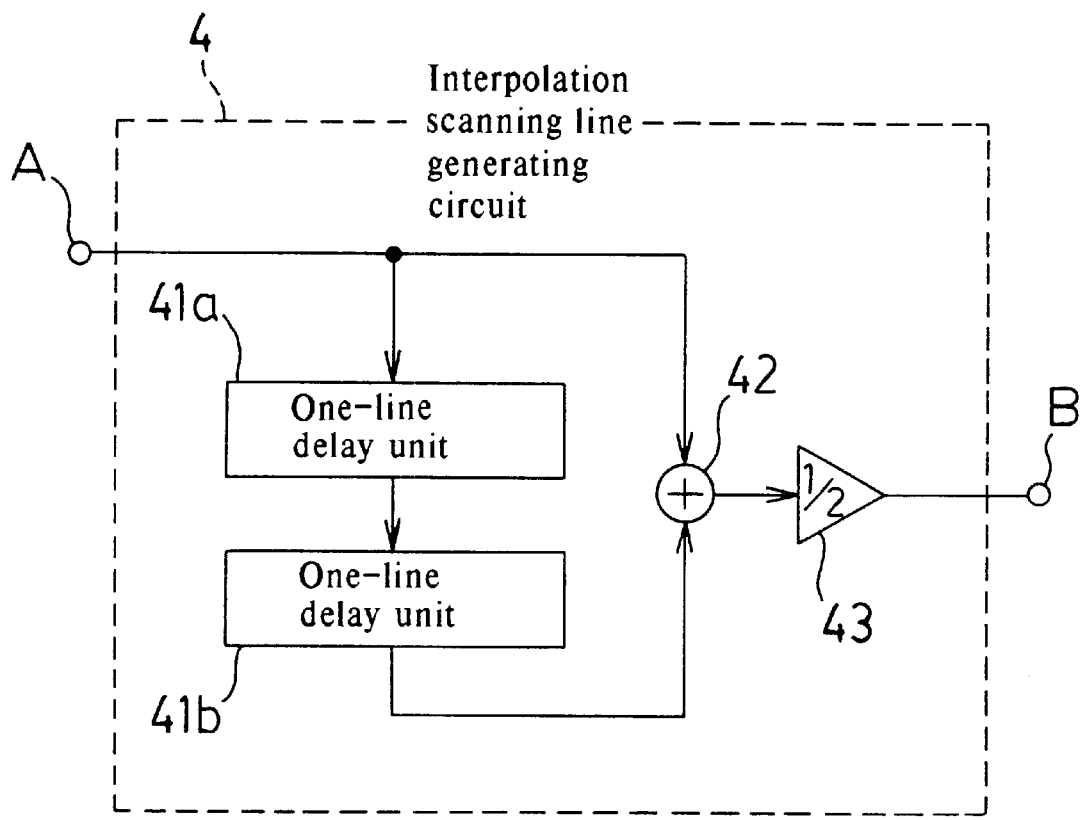
[FIG. 2] A block diagram of the interpolation scanning line generating circuit in the same embodiment 1.

The sequential scanning converter constructed as above is described below in operation. First, a video signal is supplied from the input terminal 1 to the interpolation scanning line generating circuit 4, the motion detecting circuit 7, and the sequential scanning converter circuit 6. The interpolation scanning line generating circuit 4 is made up of, for instance, the circuit shown in FIG. 2. Terminals A and B are corresponding to the portions A and B in FIG. 1. In FIG. 2, the input video signal from the terminal A is delayed by one line (one horizontal scanning time) in one-line delay units 41a and 41b, respectively, and the respective delayed signals are supplied to an adder 42. The additional signal of the adder 42 is supplied to multiplier 43 to multiply the video signal by ½. From the multiplier 43, interpolation scanning lines to be inserted between vertically adjacent real scanning lines in a field are generated, and provided to the amplitude control circuit 5.

Figure 3:
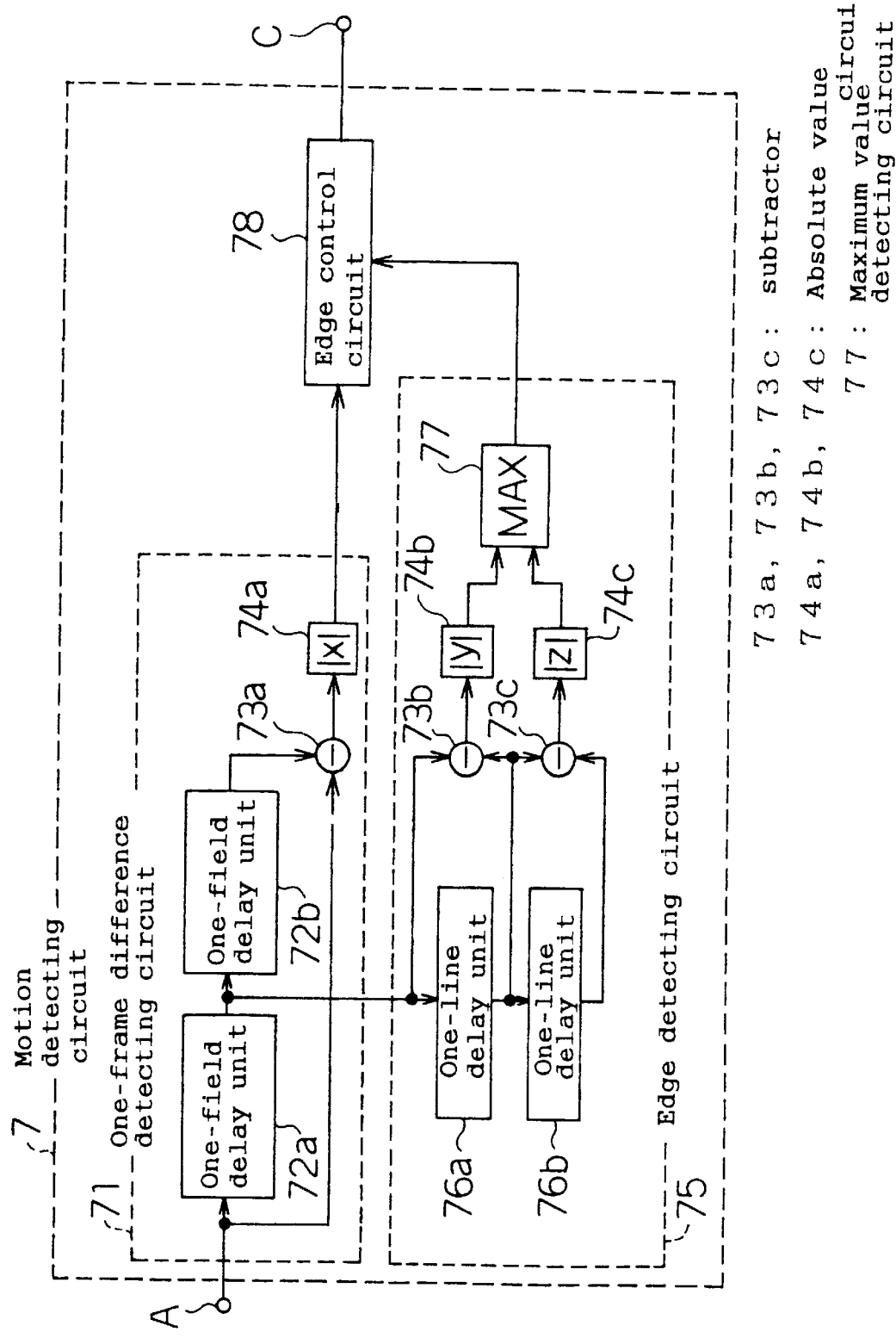
[FIG. 3] A block diagram of the motion detecting circuit in the same embodiment 1.

The motion detecting circuit 7 comprises, for instance, a circuit shown in FIG. 3. Terminals A and C are corresponding to the portions A and C in FIG. 1. In FIG. 3, the input video signal from the terminal A is delayed by one field in one-field delay units 72a and 72b in a one-frame difference detecting circuit 71, respectively, and the respective delayed signals are supplied to a subtractor 73a. In the subtractor 73a, the video signal difference between two fields in calculated, and provided to an absolute value circuit 74a. In the absolute value circuit 74a, the absolute value of the difference signal of the subtractor circuit 73a is taken. With this absolute value being as a motion amount, the motion of the input video signal can be detected by its magnitude. The output signal of the absolute value circuit 74a is supplied to an edge control circuit 78.

Further, the delay signal from the one-field delay unit 72a is delayed by one line in one-line delay units 76a and 72b in an edge detecting circuit 75, respectively, and the respective delayed signals are supplied to subtractors 73b and 73c. In the subtraotor 73b, the output difference between the one-field delay unit 72a and the one-field delay unit 76a is calculated, and in the subtractor 73c, the output difference between the one-line delay units 76a and 76b is calculated. The difference signals between the respective lines of the subtractors 73b and 73c are supplied to absolute value circuits 74b and 74c to determine the absolute value thereof. The absolute value signals in the absolute value circuits 74b and 74c are supplied to a maximum value detecting circuit 77. In the maximum value detecting circuit 77, the maximum value of the absolute value circuit 74b or the absolute value circuit 74c is detected. With the maximum value being as the edge signal of a video signal, the change amount of the edge of the input video signal can be detected by the magnitude thereof. The output signal of the maximum value detecting circuit 77 is supplied to the edge control circuit 78. In the edge control circuit 78, the difference amount of the one-frame difference detecting circuit 71 is controlled by the edge amount of the edge detecting circuit 75. For instance, if a video signal having a gentle edge in the vertical direction as shown in FIG. 4(a) is inputted to the motion detecting circuit 7, then, in the one-frame difference detecting circuit 71, a difference is taken between a one-field before signal (A) and a one-field after signal (C), and a difference value "small" is outputted because of the gentle edge. Further, in the edge detecting circuit 75, the high-frequency component of a reference field signal (B) is extracted, and an edge amount "small" is outputted because of the gentle edge. Subsequently, in the edge control circuit 78, a motion amount "small" is outputted by the difference amount "small" and the edge amount "small." Similarly, if a video signal having a steep edge in the vertical direction as shown in FIG. 4(b) is inputted, then, in the one-frame difference detecting circuit 71, a difference is taken between one-field before/after signals (E) and (G), and a difference value "large" is outputted because of the steep edge. Further, in the edge detecting circuit 75, the high-frequency component of a reference field signal (F) is extracted, and an edge amount "large" is outputted because of the steep edge. Subsequently, in the edge control circuit 78, the motion amount is treated as "small," because the difference amount is "large," but the edge amount is also "large." Thus, if video signals of the same motion amount ((D), (H)) are inputted in different video patterns as shown in FIG. 4(a), (b), the proper motion amount can be detected by detecting the edge amount. The motion amount controlled in the edge control circuit 78 is supplied to the amplitude control circuit 5.

Figure 5:
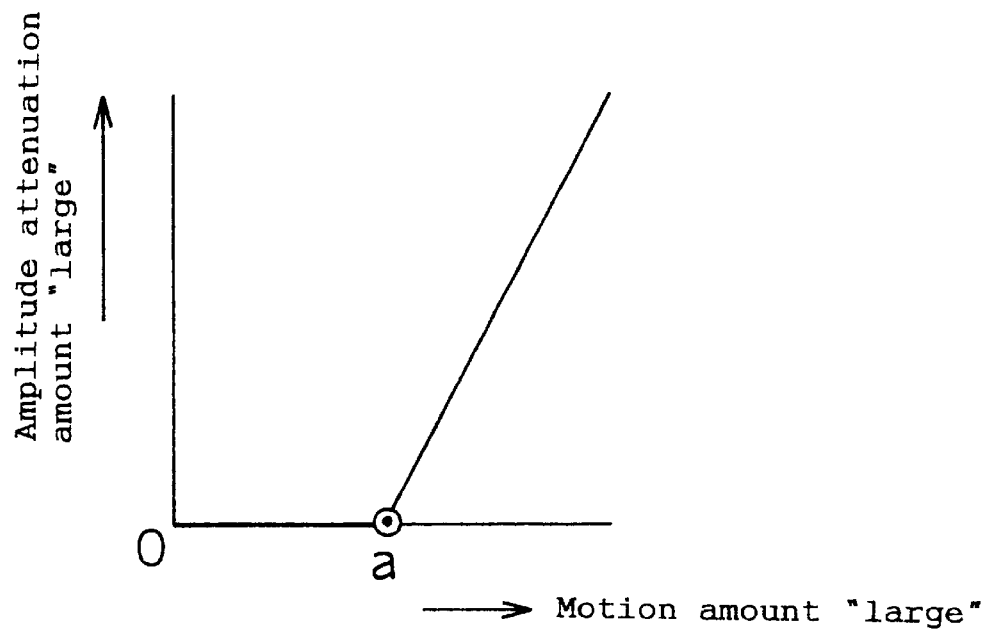
[FIG. 5] A characteristic diagram for explaining the operation of the amplitude control circuit in the same embodiment 1.

In the amplitude control circuit 5, the interpolation scanning line signal from the interpolation scanning line generating circuit 4 is corrected according to the motion amount from the motion detecting circuit 7. For instance, the motion amount vs. amplitude attenuation characteristic in the amplitude control circuit 5 is shown in FIG. 5. If the motion amount is equal to or smaller than "a," control is made "not to attenuate" the amplitude level of interpolation scanning lines, and if the motion amount is larger than "a," control is made "to attenuate" the amplitude level. The interpolation scanning lines controlled in amplitude by the amplitude control circuit 5 are supplied to the sequential scanning converter circuit 6.

In the sequential scanning converter circuit 6, the real scanning lines from the input terminal 1 and the interpolation scanning lines from the amplitude control circuit 5 are alternately selectively outputted at a period 2fH from the control signal input terminal 3, which is two times a horizontal scanning frequency fH. From the sequential scanning converter circuit 6, the sequentially scanned video signal is outputted from the output terminal 2, and the level difference between the amplitude levels of the real scanning lines and the interpolation scanning lines is eliminated if the motion amount of the video signal is "small" (FIG. 6(a)), a level difference is given between the real scanning lines and the interpolation scanning lines if the motion amount is "large" (FIG. 6 (b)), so that it is possible to prevent picture quality degradation such as streaks caused by the amplitude difference between the real scanning lines and the interpolation scanning lines in a video signal having a small motion amount.

As described above, in accordance with the embodiment 1 of the present invention, the motion detecting circuit 7 detects the motion amount of picture, and if the motion amount is small, the amplitude control of interpolation scanning lines is not performed in the amplitude control circuit 5 because the amplitude difference of interpolation lines is remarkable. Further, if the motion amount is large, since the human visual characteristic shows low eyesight for a moving object, by controlling the amplitude circuit 5 to give an amplitude difference between the real scanning lines and the interpolation scanning lines, a sequential scanning signal can be obtained in which picture quality degradation such as streaks which is remarkable if the motion is "small" in a video signal having no gradation such as animation is suppressed.

(Embodiment 2)

FIG. 7 is a block diagram showing the construction of the sequential scanning converter of the second embodiment. In FIG. 7, the portions similar to FIG. 1 are assigned the same reference numerals. The embodiment 2 is different from the embodiment 1 in the point that the motion detecting circuit 7 is replaced by a flat portion detecting circuit 9 for detecting the flat portion of a input video signal. Further, the amplitude control circuit 5 is replaced by an amplitude control circuit 8 for controlling the amplitude of the output signal of the interpolation scanning line generating circuit 4 according to the flat portion amount from the flat portion detecting circuit 9.

The sequential scanning converter as constructed above is now described in operation, and the description of the same operation as FIG. 1 is appropriately omitted. In FIG. 7, a video signal is supplied from an input terminal 1 to an interpolation scanning line generating circuit 4, the flat portion detecting circuit 9, and a sequential scanning converter circuit 6. The interpolation scanning line generating circuit 4 consists of, for instance, the circuit shown in FIG. 2, and interpolation scanning lines to be inserted between vertically adjacent real scanning lines in a field are generated. The interpolation scanning lines of the interpolation scanning line generating circuit 4 are supplied to the amplitude control circuit 8.

Figure 9A:
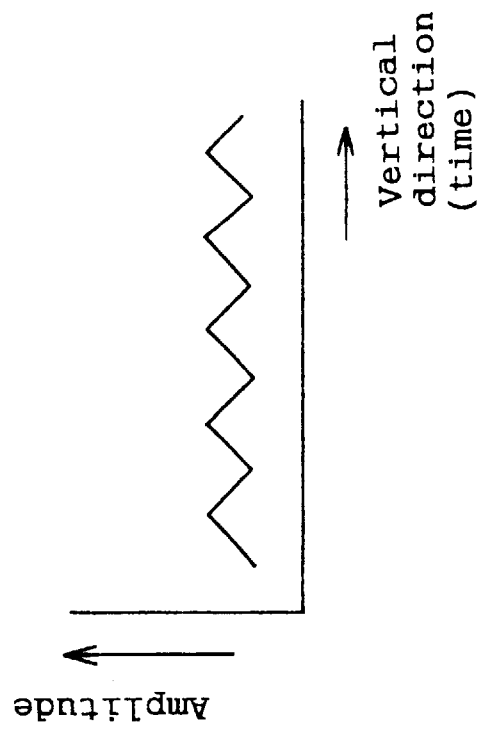
[FIG. 9] A characteristic diagram for explaining the operation of the flat portion detecting circuit in the same embodiment 2.
Figure 9B:
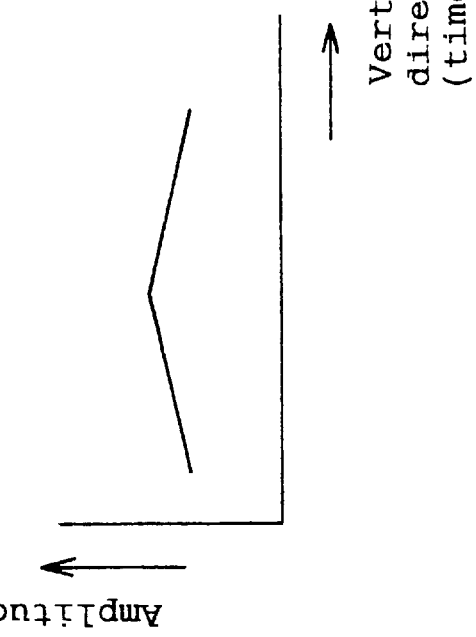

The flat portion detecting circuit 9 consists of, for instance, the circuit shown in FIG. 8. Terminals A and D are corresponding to the portion A and D in FIG. 7. In FIG. 8, the input video signal from the terminal A is delayed by one line in one-line delay units 91a and 91b, and supplied to multipliers 92a, 92b, and 92c, respectively. If the coefficients of the respective multipliers Ka, Kb, and Kc are assumed to be ¼, ⅔, and ¼, the video signal is multiplied by ¼, ½, and ¼. The output signals of the multipliers 92a and 92c are supplied to an adder 93 to undergo an adding process. The output signals of the adder 93 and the multiplier 92b are both supplied to a subtractor 94. In the subtractor 94, the output signal of the adder 93 is subtracted from the output signal of the multiplier 92b, and by a transfer function H(z) as shown by the following Equation, $$H(z) = \tfrac{1}{2} - \tfrac{1}{4}(z + H + z - H)$$  [Equation 1]

a signal having the high-frequency component in the vertical direction is supplied to an absolute value circuit 95. In the absolute value circuit 95, the absolute value of the output signal of the subtractor 94 is determined. With this absolute value output being as the flat portion of the video signal, the flat portion amount of the input video signal can be detected by the magnitude thereof. For instance, if a gentle video signal as shown in FIG. 9(a) is inputted to the flat portion detecting circuit 9, little high-frequency component in the vertical direction is extracted, and thus a flat portion amount "large" is outputted for most of the vertical pixel units. Similarly, if a video signal having a steep edge in the vertical direction as shown in FIG. 9(b) is inputted, the high-frequency in the vertical direction is extracted, and thus flat portion amounts "small" and "large" are alternately outputted for each pixel. Accordingly, the flat portion amount can be detected for each pixel from the scanning line area for three lines, as shown in FIG. 8. The flat portion amount from the flat portion amount detecting circuit 9 is supplied to the amplitude control circuit 8.

Figure 10:
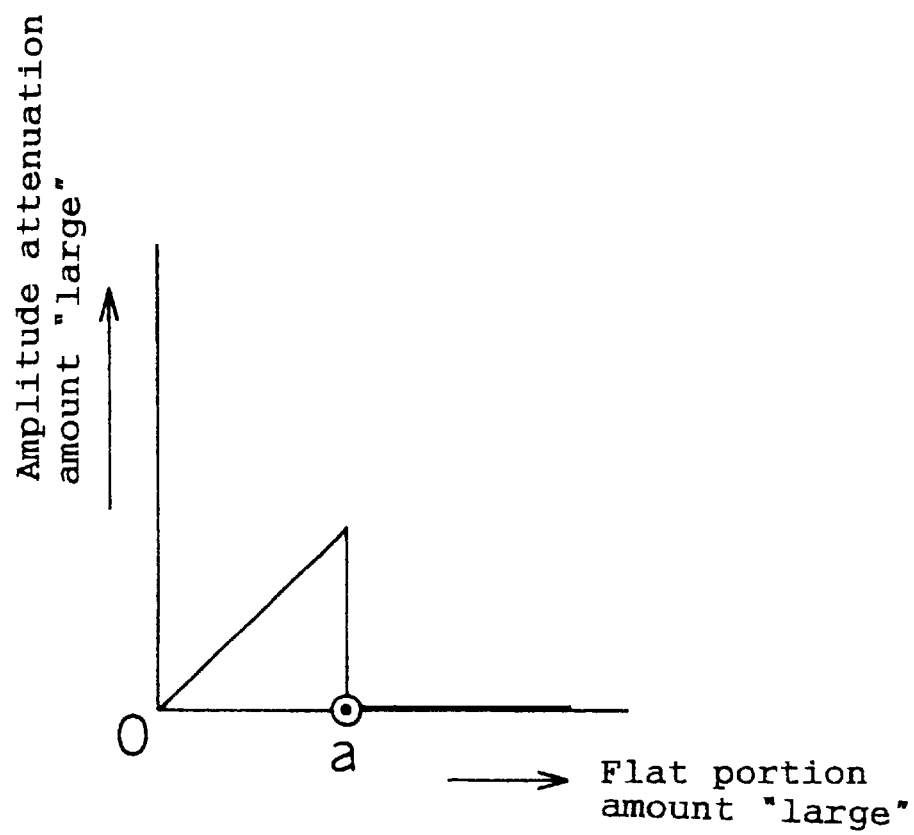
[FIG. 10] A characteristic diagram for explaining the operation of the amplitude control circuit in the same embodiment 2.

In the amplitude control circuit 8, the interpolation scanning line signal from the interpolation scanning line generating circuit 4 is corrected according to the flat portion amount from the flat portion detecting circuit 9. For instance, the flat portion amount vs. amplitude attenuation amount characteristic in the amplitude control circuit 8 is shown in FIG. 10. If the flat portion amount is equal to or smaller than "a" control is made "to attenuate" the amplitude level of interpolation scanning lines, and if the flat portion amount is larger than "a," control is made "not to attenuate" the amplitude level. The interpolation scanning lines controlled in amplitude level by the amplitude control circuit 8 are supplied to the sequential scanning converter circuit 6.

In the sequential converter circuit 6, the real scanning lines from the input terminal 1 and the interpolation scanning lines from the amplitude control circuit 8 are alternately selectively outputted at a period 2fH from a control signal input terminal 3, which is two times a horizontal frequency fH. From the sequential scanning converter circuit 6, the sequentially scanned video signal is outputted from an output terminal 2, and in the area where the flat portion amount of the video signal is "small," an amplitude level difference is given between real scanning lines and interpolation scanning lines (FIG. 11(a)), by which the sharpness in the vertical direction can apparently be increased. Further, if the flat portion amount is "large," the level difference between real scanning lines and interpolation scanning lines can be eliminated (FIG. 11(b)) to prevent picture quality degradation such as streaks caused by the amplitude difference between real scanning lines and interpolation scanning lines in a video signal having a large flat portion.

As described above, in accordance with the embodiment 2 of the present invention, the flat portion detecting circuit 9 detects the flat portion of a video signal, and by controlling the amplitude control circuit 8 to provide an amplitude difference between real scanning lines and interpolation scanning lines in an area having a small flat portion, for instance, the sharpness of a natural picture can be kept. Further, in an are a having a large flat portion, picture quality degradation such as streaks is remarkable if an amplitude difference is given between real scanning lines and interpolation scanning lines, and thus, by preventing the amplitude control of interpolation scanning lines from being performed in the amplitude control circuit 8, a sequential scanning signal can be obtained which can faithfully play back an image having no gradation such as an animation created by CG or the like.

(Embodiment 3)

FIG. 12 is a block diagram showing the construction of the sequential scanning converter of the third embodiment. In FIG. 12, the portions similar to FIGS. 1 and 7 are assigned the same reference numerals. The embodiment 3 is different form the embodiment 2 of FIG. 7 in the point that there are added a motion detecting circuit 7 for detecting the motion of an input video signal, and an OR circuit 10 for ORing the output signals of the motion detecting circuit 7 and the flat portion detecting circuit 9. Further, they are also different in the point that the amplitude control circuit 8 is replaced by an amplitude control circuit 11 for controlling the amplitude of the output signal of the interpolation scanning line generating circuits 4 according to the logical sum of the OR circuit 10.

The sequential scanning converter as constructed above is now described in operation, and the description of the same operation as FIGS. 1 and 7 is appropriately omitted. In FIG. 12, a video signal is supplied from an input terminal 1 to the interpolation scanning line generating circuit 4, the motion detecting circuit 7, the flat portion detecting circuit 9, and the sequential converter circuit 6. The interpolation scanning line generating circuit 4 consists of, for instance. the circuit shown in FIG. 2, and interpolation scanning lines to be inserted between adjacent real scanning lines in the vertical direction in a field. The Interpolation scanning lines of the interpolation scanning line generating circuit 4 are provided to the amplitude control circuit 11.

The motion detecting circuit 7 is comprised of, for instance, the circuit shown in FIG. 3, and detects the motion amount by the one-frame difference and edge amount of the video signal 1.

Figure 13A:
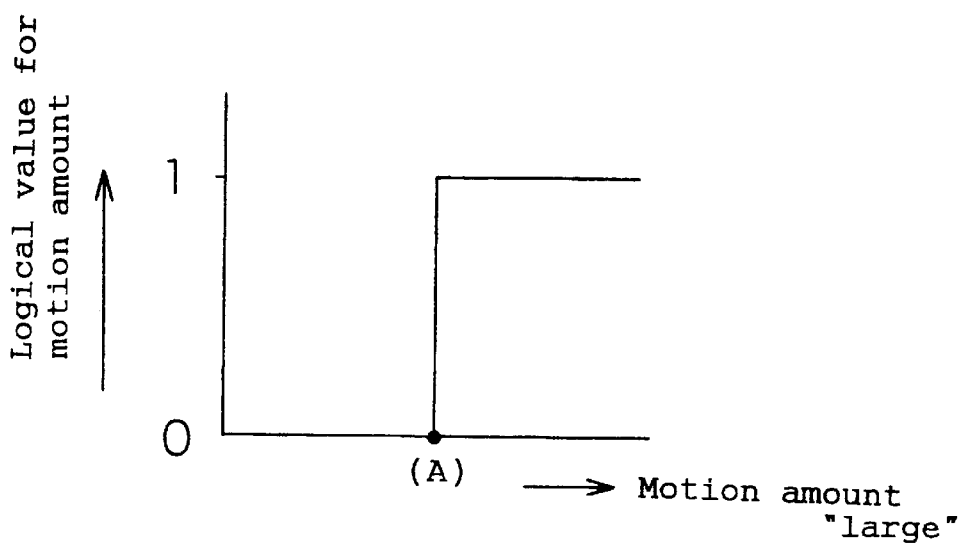
[FIG. 13] A characteristic diagram for explaining the operation of the OR circuit in the same embodiment 3.
Figure 13B:
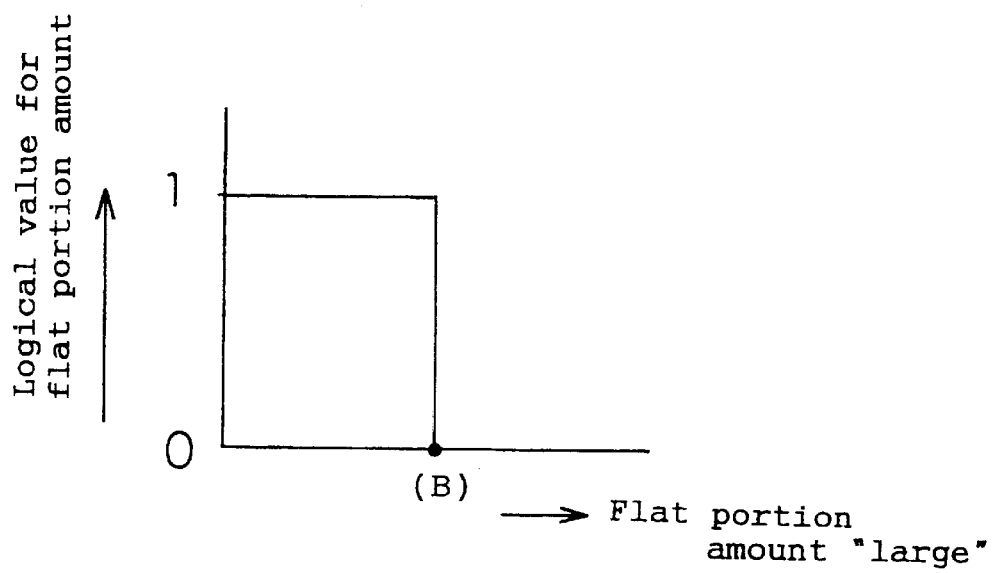

The flat portion detecting circuit 9 consists of, for instance, the circuit shown in FIG. 8, and detects the flat portion amount of the video signal for each pixel by extracting the high-frequency component of the video signal in the vertical direction. The motion amount of the motion detecting circuit 7 and the flat portion amount of the flat portion detecting circuit 9 are supplied to the OR circuit 10. In the OR circuit 10, certain threshold values are set for the motion amount and the flat portion amount, respectively, and the threshold value of the motion amount is ORed with the threshold value of the flat portion amount. For instance, the characteristic of the logical value for the motion amount of the motion detecting circuit 7 in the OR circuit 10 is shown in FIG. 13(a). In FIG. 13(a), a threshold value (A) of the motion amount is set, and a logical value "0" is given if the motion amount is smaller than (A), and a logical value "1" if equal to or larger than (A). Further, the characteristic of the logical value for the flat portion amount of the flat portion detecting circuit 9 is shown in FIG. 13(b). In FIG.

13(b), a threshold value. (B) of the flat portion amount is set, and a logical value "1" is given if the flat portion amount is equal to or smaller than (B), and a logical value "0" if larger than (B). Then, the motion amount is ORed with the logical value for the flat portion amount. This logical sum takes the logical values as shown in Table 1 for instance.

TABLE 1

| Logical value for motion amount X | Logical value for flat portion amount Y | OR operation X⊕Y | Amplitude control of interpolation scanning lines for logical sum |
|---|---|---|---|
| 0 | 0 | 0 | No attenuation |
| 0 | 1 | 1 | Attenuation |
| 1 | 0 | 1 | Attenuation |
| 1 | 1 | 1 | Attenuation |

For instance, if the motion amount of a video signal is small ("0") and the flat portion amount is large ("0"), the logical sum is "0", and the logical sum becomes "1" except this combination of the logical values of the motion amount and the flat portion amount. The output logical value of the OR circuit 10 is supplied to the amplitude control circuit 11.

In the amplitude control circuit 11, the interpolation scanning line signal from the interpolation scanning line generating circuit 4 is corrected according to the output logical value from the OR circuit 10. For instance, the control of the amplitude attenuation amount for the logical value from the OR circuit 10 in the amplitude control circuit 11 is shown in Table 1. If the logical sum is "0", the control is made "not to attenuate" the amplitude level of interpolation scanning lines, and if the logical sum is "1," control is made "to attenuate" the amplitude level. The interpolation scanning lines controlled in amplitude level by the amplitude control circuit 11 are supplied to the sequential converter circuit 6.

In the sequential scanning converter circuit 6, real scanning lines from the input terminal 1 and interpolation scanning lines from the amplitude control circuit 11 are alternately selectively outputted at a period 2fH from a control signal input terminal 3, which is two times a horizontal scanning frequency fH. From the sequential scanning converter circuit 6, the sequentially scanned video signal is outputted from an output terminal 2, and if the motion amount of a video signal is "small" and the flat portion amount is "large," then, by eliminating the amplitude level difference between real scanning lines and interpolation scanning lines (FIG. 14(a)), picture quality degradation such as streaks caused by the amplitude difference between real scanning lines and interpolation scanning lines can be prevented in a video signal having a slow movement and a flat portion. Further, if the motion amount is "small" and the flat portion is "small," or the motion amount is "large" and the flat portion amount is "large," or the motion amount is "large" and the flat portion amount is "small," the sharpness in the vertical direction can apparently be increased by giving a level difference between real scanning lines and interpolation scanning lines (FIG. 14(b)).

As described above, in accordance with the embodiment 3 of the present invention, the motion amount of the motion detecting circuit 7 and the flat portion amount of the flat portion detecting circuit 9 are detected, and the logical sum of them is taken in the OR circuit 10, and in an area of a large flat portion amount, since picture quality degradation such as streaks is remarkable if an amplitude difference is given between real scanning lines and interpolation scanning lines, the amplitude control of interpolation scanning lines can be prevented in the amplitude control circuit 11 to enable an image having no gradation such as an animation created by CG or the like to be faithfully played back. In addition, if the motion amount is "small" and the flat portion amount is "small," or the motion amount is "large" and the flat portion amount is "large," or the motion amount is "large" and the flat portion amount is "small," then, by giving an amplitude difference between real scanning lines and interpolation scanning lines, a sequential scanning signal can be obtained which enables the sharpness, for instance, of a natural picture to be kept.

(Embodiment 4)

FIG. 15 is a block diagram showing the construction of the sequential scanning converter of the fourth embodiment. In FIG. 15. the portions similar to FIG. 12 are assigned the same reference numerals. The embodiment 4 is different from the embodiment 3 of FIG. 12 in the point that there are added to a freeze-frame picture judging circuit 12 for detecting the proportion of a freeze-frame picture within one field from the motion amount of the motion amount detecting circuit 7, and a flat portion judging circuit 13 for detecting the proportion of a flat portion area within one field from the flat portion amount of the flat portion detecting circuit 9, and in addition, that there is added a frequency judging circuit 14 for detecting a freeze-frame picture having a large flat portion from the output signals of the freeze-frame picture judging circuit 12 and the flat portion judging circuit 13. Further, they are different in the point that the amplitude control circuit 11 is replaced by an amplitude control circuit 15 for controlling the amplitude of the output signal of the interpolation scanning line generating circuit 4 according to the control signal from the frequency judging circuit 14.

The sequential scanning converter as constructed above is described below in operation, and the description of the sample operation as FIG. 12 is approximately omitted. In FIG. 15, a video signal is supplied from an input terminal 1 to the interpolation scanning generating circuit 4, the motion detecting circuit 7, the flat portion detecting circuit 9, and the sequential scanning converter circuit 6. The interpolation scanning line generating circuit 4 is comprised of, for instance, the circuit shown in FIG. 2, and interpolation scanning lines to be inserted between adjacent real scanning lines in the vertical direction in a field are generated. The interpolation scanning lines of the interpolation scanning line generating circuit 4 are supplied to the amplitude control circuit 15.

The motion detecting circuit 7 consists of, for instance, the circuit shown in FIG. 3, and detects the motion amount by the one-frame difference and edge amount of a video signal 1.

The flat portion detecting circuit 9 is made up of, for instance, the circuit shown in FIG. 8, and detects the flat portion amount of a video signal for each pixel by extracting the high-frequency component in the vertical direction of the video signal. The motion amount of the motion detecting circuit 7 is supplied to the freeze-frame picture judging circuit 12, and the flat portion amount of the flat portion detecting circuit 9 is supplied to the flat portion judging circuit 13.

Figure 16:
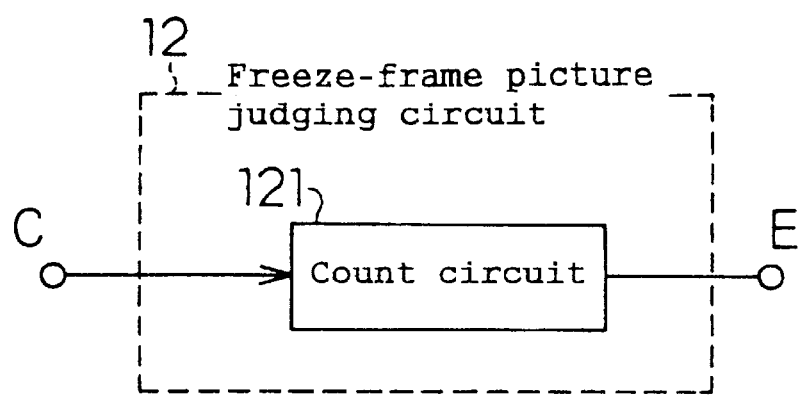
[FIG. 16] A block diagram of the freeze-frame picture judging circuit in the same embodiment 4.
Figure 17:
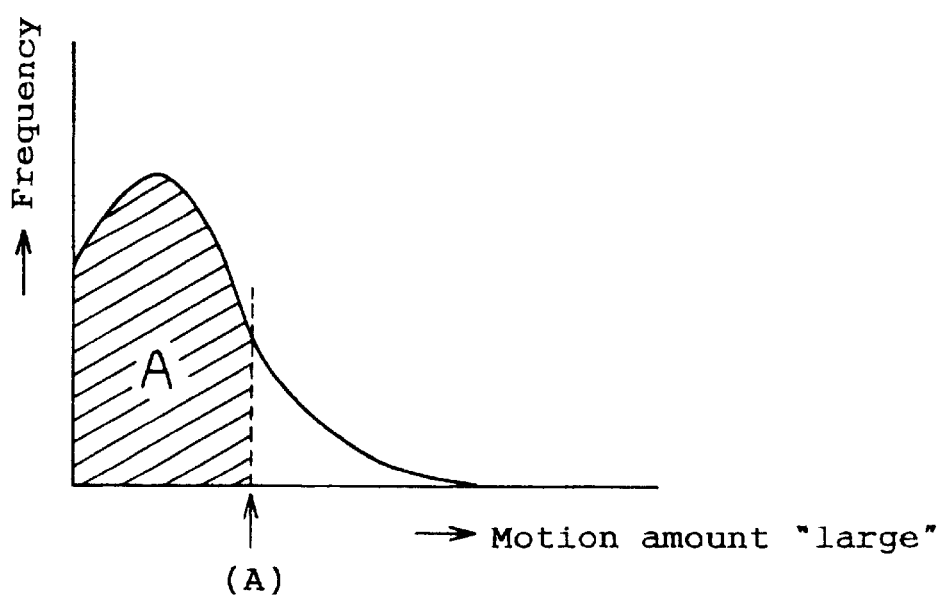
[FIG. 17] A characteristic diagram for explaining the operation of the freeze-frame picture judging circuit in the same embodiment 4.

The freeze-frame picture judging circuit 12 consists of, for instance, the circuit shown in FIG. 16. Terminals C and E are corresponding to the portions C and E in FIG. 15. In FIG. 16, the motion amount for each pixel from the terminal C is provided to a count circuit 121 to count the frequency of the motion amount in one field. For instance, the histogram of the frequency for the motion amount in one field of a given video signal is shown in FIG. 17.

Figure 18:
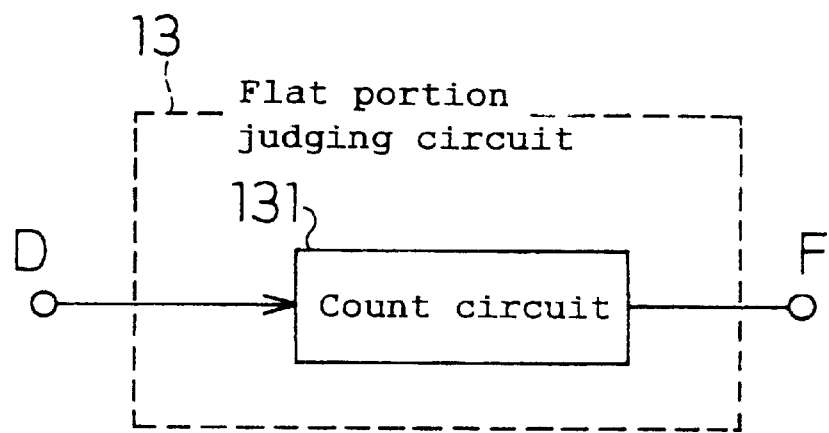
[FIG. 18] A block diagram of the flat portion judging circuit in the same embodiment 4.
Figure 19:
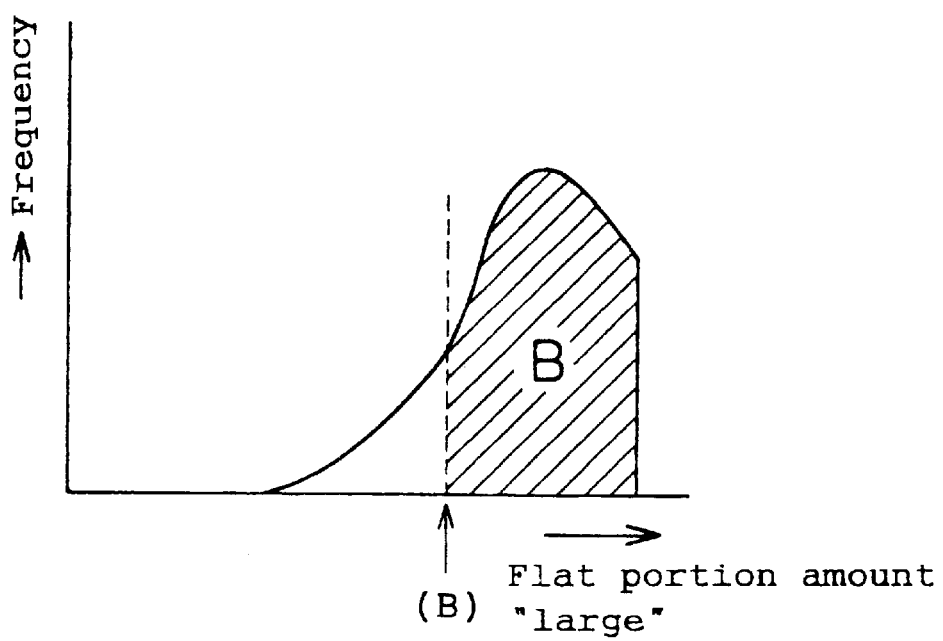
[FIG. 19] A characteristic diagram for explaining the operation of the flat portion judging circuit in the same embodiment 4.

The flat portion judging circuit 13, consists of, for instance, the circuit shown in FIG. 18. Terminals D and F are corresponding to the portions D and F in FIG. 15. In FIG. 18, the flat portion amount from the terminal D is supplied to a count circuit 131 to count the frequency of the flat portion amount in one field. For instance, the histogram of the frequency for the flat portion amount in one field of a given video signal is shown in FIG. 19.

The output signals of the freeze-frame picture judging circuit 12 and the flat portion judging circuit 13 are supplied to the frequency judging circuit 14. In the frequency judging circuit 14, it is judged whether the frequency of a certain motion amount and the frequency of a flat portion amount are both equal to or larger than a given criterion (for instance, 80%). For instance, in the frequency judging circuit 14, if the frequency equal to or smaller than a motion amount (A) (area A) occupies 80% of one field as shown in FIG. 17, and the frequency equal to or larger than a flat portion (B) (area B) occupies 80% of one field as shown in FIG. 19, then a logical value "0" is outputted, otherwise a logical value "1" is outputted to the amplitude control circuit 15.

In the amplitude control circuit 15, the interpolation scanning signal from the interpolation scanning line generating circuit 4 is corrected according to the control signal from the frequency judging circuit 14. For instance, if the logical value from the frequency judging circuit 14 is "0," it can be judged that there are many freeze-frame pictures and there are also many flat portion areas in one field, and thus control is made "not to attenuate" the amplitude level of interpolation scanning lines, and control is made "to attenuate" the amplitude level if the logical value is "1."Interpolation scanning lines controlled in amplitude level by the amplitude control circuit 15 are supplied to the sequential scanning converter circuit 6.

In the sequential scanning converter circuit 6, real scanning lines from the input terminal 1 and interpolation scanning lines from the amplitude control circuit 15 are alternately selectively outputted at a period 2fH from a control signal Input terminal 3, which is two times a horizontal scanning frequency fH. From the sequential scanning converter circuit 6, sequentially scanned video signals are outputted from an output terminal 2, and if freeze-frame pictures occupy, for instance, 80% or more in the video signal within one field and flat portion areas also occupy 80% or more, then, by eliminating the amplitude level difference between real scanning lines and interpolation scanning lines (FIG. 20(a)), picture quality degradation such as streaks caused by the amplitude difference between real scanning lines and interpolation scanning lines can be prevented in a picture having slow movement and flat portion areas. Further, if the proportion of freeze-frame pictures in one field is small, or if the proportion of flat portion areas is small, the sharpness in the vertical direction can apparently be increased by giving a level difference between real scanning lines and interpolation scanning lines (FIG. 20(b)).

As described above, in accordance with the embodiment 4 of the present invention, the frequency of the motion amount in one field is judged in the freeze-frame judging circuit 12, and the frequency of the flat portion amount in one field is judged in the flat portion judging circuit 13, and in the frequency judging circuit 14, a picture having many still frames and many flat portion areas is judged, and by controlling the amplitude control circuit 15 so as to give no amplitude difference between real scanning lines and interpolation scanning lines, an image having no gradation such as an animation created by CG or the like can be faithfully reproduced. Further, for a picture having less still frames or less flat portion amount in one field, by giving an amplitude difference between real scanning lines and interpolation scanning lines, a sequential scanning signal can be obtained which enables the sharpness, for instance, of a natural picture to be kept.

(Embodiment 5)

FIG. 21 is a block diagram showing the construction of the sequential scanning converter of the fifth embodiment. In FIG. 21, the portions similar to FIG. 12 are assigned the same reference numerals. The embodiment 5 is different from the embodiment 3 of FIG. 12 in the point that one-line delay units 18a and 18b for delaying an input video signal by one line are added. Further, they are different in the point that the above motion detecting circuits 7 and flat portion detecting circuit 9 are replaced by a motion detecting circuit 16 and a flat portion detecting circuit 17, which detect the motion amount of the input video signal and the flat portion amount, respectively, while sharing one-line delay units 18a and 18b.

The sequential scanning converter as constructed above is described below in operation, and the description of the same operation as FIG. 12 is appropriately omitted. In FIG. 21, a video signal is supplied from an input terminal 1 to an interpolation scanning generating circuit 4, the motion detecting circuit 16, a sequential scanning converter circuit 6. The interpolation scanning line generating circuit 4 is comprised of, for instance, the circuit shown in FIG. 2, and interpolation scanning lines to be inserted between adjacent real scanning lines in the vertical direction in a field are generated. The interpolation scanning lines of the interpolation scanning line generating circuit 4 are provided to an amplitude control circuit 11.

Figure 22:
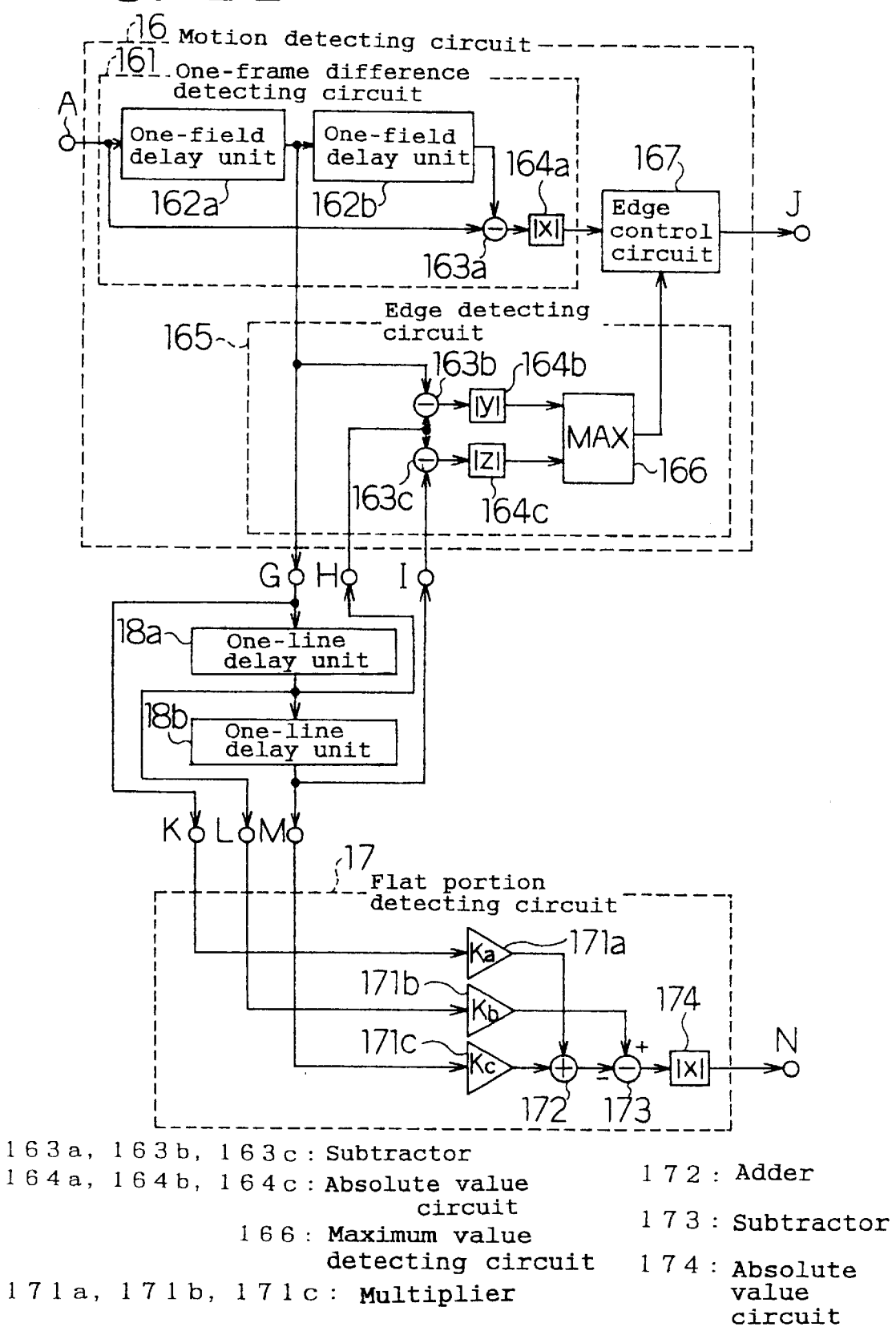
[FIG. 22] A block diagram of the motion detecting circuit and one-line delay units and flat portion detecting circuit in the same embodiment 4.

The motion detecting circuit 16 consists of, for instance, the circuit shown in the motion detecting circuit 16 in FIG. 22. Terminals A, G, H, I, and J are corresponding to the portions A, G, H, I, and J in FIG. 21, respectively. In FIG. 22, the input video signal from the terminal A is delayed by one field in one-field delay units 162a and 162b in a one-frame difference detecting circuit 161, respectively, and the respective delayed signals are supplied to a subtractor 163a. In the subtractor 163a, the difference between the video signals of the two fields is taken, and supplied to an absolute value circuit 164a. In the absolute value circuit 164a, the absolute value of the difference signal from the subtractor circuit 163a is taken. With this absolute value being as a motion amount, the motion of the input video signal can be detected by the magnitude thereof. The output signal of the absolute value circuit 164a is provided to an edge control circuit 167.

Further, the delayed signal from the one-field delay unit 162a is delayed by one line in one-line delay units 18a and 18b via an edge detecting circuit 165, respectively, and supplied to subtracters 163b and 163c in the edge detecting circuit 165. In the subtractor 163b, the output difference between the one-field delay unit 162a and the one-line delay unit 18a is taken, and in the subtractor 163c, the output difference between the one-line delay units 18a and 18b is taken. The respective inter-line difference signals of the subtractors 163b and 163c are supplied to absolute value circuits 164b and 164c to take the absolute values thereof. The absolute value signals of the absolute value circuits 164b and 164c are provided to a maximum value detecting circuit 166. In the maximum value detecting circuit 166, the maximum value of the absolute value circuit 164b or the absolute value circuit 164c is detected. With this maximum value being as an edge signal of the video signal, the change amount of the edge of the input video signal can be detected by the magnitude thereof. The output signal of the maximum value detecting circuit 166 is supplied to an edge control circuit 167. In the edge control circuit 167, the difference amount of the one-frame difference detecting circuit 161 is controlled by the edge amount of the edge detecting circuit 165.

As described in the (embodiment 1), even if video signals having different image patterns and the same motion amount ((D), (H)) as shown in FIG. 4(a) and FIG. 4(b) are inputted to the motion detecting circuit 16, it can detect the correct motion amount by detecting the edge amount. The motion amount controlled in the edge control circuit 167 is provided to the OR circuit 10. Further, the delayed signal from the one-field delay unit 162a is supplied to the flat portion detection circuit 17 via the one-line delay units 18a and 18b.

The flat portion detecting circuit 17 is made up of, for instance, the circuit shown in the flat portion detecting circuit 17 in FIG. 22. Terminals K, L, M, and N are corresponding to the portions X, L, M, and N in FIG. 21. In FIG. 22, the video signal delayed by one field in the one-field delay unit 162a, and the video signals delayed by one line in the one-line delay units 18a and 18b, respectively, are supplied from the terminals K, L, M to multipliers 171a, 171b, and 171c. If the coefficients Ka, Kb, and Kc of the individual multipliers are assumed to be ¼, ½, and ¼, the video signal is multiplied by ¼, ½ and ¼, respectively. The output signals of the multipliers 171a and 171c are provided to an adder 172 to under go an adding operation. The output signals of the adder 172 and the multiplier 171b are both supplied to a subtractor 173. In the subtracter 173, the output signal from the adder 172 is subtracted from the output signal of the multiplier 171b, and by a transfer function H(z) as shown by the following Equation, $$H(z)=\tfrac{1}{2}-\tfrac{1}{4}(z+H+z-H)$$ [Equation 2]

a signal having the high-frequency component in the vertical direction is supplied to an absolute value circuit 174. In the absolute value circuit 174, the absolute value of the output signal of the subtractor 173 is taken. With this absolute value output being as the flat portion of the video signal, the flat portion amount of the video signal can be detected by the magnitude thereof.

As described in the (embodiment 2), the first portion detecting circuit 17 can detect the flat portion amount for each pixel from a scanning area for three lines as shown in FIG. 8. The flat portion amount from the flat portion detecting circuit 17 is provided to the OR circuit 10.

The motion amount of the motion detecting circuit 16 and the flat portion amount of the flat portion detecting circuit 17 are supplied to the OR circuit 10. In the OR circuit 10, a certain threshold value is set for the motion amount and the flat portion amount, respectively, and the threshold value of the motion amount is ORed with the threshold value of the flat portion amount. The output logical value of the OR circuit 10 is supplied to the amplitude control circuit 11.

In the amplitude control circuit 11, the interpolation scanning line signal from the interpolation scanning line generating circuit 4 is corrected according to the output logical value from the OR circuit 10. For instance, the control of the amplitude attenuation amount for the logical value of the OR circuit 10 in the amplitude control circuit 11 is shown in Table 1. The interpolation scanning lines controlled in amplitude level by the amplitude control circuit 11 are supplied to the sequential scanning converter circuit 6.

In the sequential scanning converter circuit 6, real scanning lines from the input terminal 1 and interpolation scanning lines from the amplitude control circuit 11 are alternately selectively outputted at a period 2fH from a control signal input terminal 3, which is two times a horizontal scanning frequency fH. From the sequential scanning converter circuit 6, sequentially scanned video signals are outputted from an output terminal 2, and by eliminating the amplitude level difference between real scanning lines and interpolation scanning lines if the motion amount of the video signal is "small" and the flat portion is "large" (FIG. 14(a)), picture quality degradation such as streaks caused by the amplitude difference between real scanning lines and interpolation scanning lines can be prevented in a video signal having a slow movement and a flat portion area. Further, if the motion amount is "small" and the flat portion amount is "small," or the motion amount is "large" and the flat portion amount is "large," or the motion amount is "large" and the flat portion amount is "small," then, by giving a level difference between real scanning lines an interpolation scanning lines (FIG. 14(b)), the sharpness in the vertical direction can apparently be increased.

As described above, in accordance with the embodiment 5 of the present invention, by sharing the one-line delay units used between the motion detecting circuit 16 and the flat portion detecting circuit 17, the one-line delay units can be decreased. Further, the motion amount is detected in the motion detecting circuit 16, the flat portion detecting amount is detected in the flat portion detecting circuit 17, and their logical sum is taken in the OR circuit 10, and since picture quality degradation such as streaks will be remarkable if an amplitude difference is given between real scanning lines and interpolation scanning lines in an area having a small motion amount and a large flat portion amount, a picture having no gradation such as an animation created by CG or the like can be faithfully reproduced by preventing the amplitude control of interpolation scanning lines from being carried out in the amplitude control circuit 11. Further, if the motion amount is "small" and the flat portion amount is "small," or the motion amount is "large" and the flat portion is "large," or the motion amount is "large" and the flat portion is "small," then, by giving an amplitude difference between real scanning lines and interpolation scanning lines, a sequential scanning signal can be obtained which enables the sharpness of, for instance, a natural picture to be maintained.

Although, in the embodiments 1 to 5, the edge detecting circuit 75 in the motion detecting circuit 7 has been constructed as shown in FIG. 3, the present invention is not limited to this, but it is to be understood that the edge detection can be similarly performed, for instance, by inter-line edge detection in which an inter-line difference is taken between the output signals of the one-line delay units 76a and 76b, or inter-field edge detection in which an inter-field difference. is taken between the one-field delay units 72a and 72b.

Further, in the embodiment 5, a construction is employed in which the one-line delay units 18a and 18b in FIG. 21 are shared between the motion detecting circuit 16 and the flat portion detecting circuit 17. However, this is not limitation, and it is to be understood that similar control can be made by a construction in which, for instance, the one-line delay units 18a and 18b are shared instead of the one-line delay units 41a and 41b in the interpolation scanning lie generating circuit 4.

Furthermore, as devices to which the sequential scanning converter of the present invention as described above is applied, there are liquid crystal display, CRT, plasma display, DMD (Digital Micro-mirror Device), and the like. These display devices usually comprise the sequential scanning converter of the present invention, a display panel for displaying the signal outputted from the sequential scanning converter, and a display control circuit for controlling the display.

As described above, in accordance with the first invention, the motion detecting means detects the motion amount of a picture, and if the motion amount is small, the amplitude control of interpolation scanning lines by the amplitude control means in not performed because the amplitude difference between interpolation lines is remarkable. Further, the human eyesight becomes low for a moving object as the characteristic of the human sense of sight, and thus, if the motion amount is large, by controlling the amplitude control means to give an amplitude difference between real scanning lines and interpolation scanning lines, a sequential scanning signal can be obtained which enables the suppression of picture quality degradation such as streaks which is remarkable in a picture signal having no gradation such as an animation when the motion is "small," and its practical effect is large.

Further, in accordance with the second invention, the flat portion detecting means detects the flat portion of a video signal, and for an area having less flat portion, by controlling the amplitude control means to give an amplitude difference between real scanning lines and interpolation scanning lines, a picture such as a natural picture can maintain the sharpness. Further, for an area having much flat portion, since picture quality degradation such as streaks becomes remarkable if an amplitude difference is given between real scanning lines and interpolation scanning lines, the amplitude control of interpolation scanning lines is not performed in the amplitude control means, thereby to obtain a sequential scanning signal which enables a picture having no gradation such as an animation created by CG or the like to be faithfully reproduced. Its practical effect is great.

Further, in accordance with the third invention, the motion amount of the motion detecting means and the flat portion amount of the flat portion detecting means are detected, and if it is determined in the judging means that the motion amount is small and the flat portion amount is large, picture quality degradation such as streaks is remarkable if an amplitude difference is given between real scanning lines and interpolation scanning lines, and thus, by preventing the amplitude control of interpolation scanning lines from being performed in the amplitude control means, a picture such as an animation created by CG or the like can be faithfully reproduced. Furthermore, if the motion amount is "small" and the flat portion is "small," or the motion amount is "large" and the flat portion amount is "large," or the motion amount is "large" and the flat portion amount is "small," then, by giving an amplitude difference between real scanning lines and interpolation scanning lines, a sequential scanning signal can be obtained which allows the sharpness of, for instance, a natural picture to be kept. Its practical effect is significant.

Further, in accordance with the fourth invention, the frequency of the motion amount in one field is judged by the freeze-frame picture judging means, the frequency of the flat portion amount in one field is judged by the flat portion judging means, and a picture having much freeze-frame picture and much flat portion area is judged by the frequency judging means, and by controlling the amplitude control means to give no amplitude difference between real scanning lines and interpolation scanning lines, a picture having no gradation such as an animation created by CG or the like can be faithfully reproduced. In addition, for a picture having less flat portion amount, by giving an amplitude difference between real scanning lines and interpolation scanning lines, a sequential scanning signal can be obtained which enables the sharpness of, for instance, a natural picture to be kept. Its practical effect is significant.

Further, in accordance with the fifth invention, by sharing a group of one-line delay means used between the motion detecting means and the flat portion detecting means, the group of one-line delay means can be reduced. Furthermore, the motion amount is detected by the motion detecting means and the flat portion amount is detected by the flat portion detecting means, and if an area having a small motion amount and a large flat portion amount is judged by the judging means, then, since picture quality degradation such as streaks is remarkable if an amplitude difference is given between real scanning lines and interpolation scanning lines, a picture having no gradation such as an animation created by CG or the like can be faithfully reproduced by preventing the amplitude control of interpolation scanning lines from being performed in the amplitude control means. In addition, if the motion amount is "small" and the flat portion amount is "small," or the motion amount is "large" and the flat portion amount is "large," or the motion amount is "large" and the flat portion amount is "small," then, by giving an amplitude difference between real scanning lines and interpolation scanning lines, a sequential scanning signal can be obtained which enables the sharpness of, for instance, a natural picture to be kept. Its practical effect is substantial.

What is claimed is:

1. A sequential scanning converter comprising:
   interpolation scanning line generating means of generating interpolation scanning lines from an interlaced input video signal to provide an interpolated video signal;
   amplitude control means of controlling the amplitude of the interpolated video signal of said interpolation scanning line generating means;
   motion detecting means of detecting the motion amount of said interlaced input video signal, in which
   (a) the interlaced video signal is delayed by the time of two fields to provide a frame-delayed video signal,
   (b) the interlaced video signal is subtracted from the frame-delayed video signal to form a first value,
   (c) the interlaced video signal is delayed by the time of one field to provide a field-delayed video signal,
   (d) the field-delayed video signal is delayed by at least one scanning line to provide a line-delayed video signal,
   (e) the field-delayed video signal is subtracted from the line-delayed video signal to form a second value, and
   (f) the first value and the second value are provided to the amplitude control means; and
   sequential scanning converter means of performing a conversion to a sequential scanning signal by using said interlaced input video signal and an output signal from said amplitude control means,
   wherein said amplitude control means performs control according to the output signals of said motion detecting means.

2. A sequential scanning converter as set forth in claim 1, wherein said amplitude control means does not change the amplitude level of the output signal of said interpolation scanning line generating means if said motion amount from said motion detecting means is smaller than a predetermined threshold.

3. A display device comprising:

the sequential scanning converter described in claim 1;

a display panel for displaying the signal outputted from the sequential scanning converter; and a display control circuit for controlling the display.

4. A sequential scanning converter comprising:

interpolation scanning line generating means of generating interpolation scanning lines from an interlaced input video signal to provide an interpolated video signal;

amplitude control means of controlling the amplitude of the interpolated video signal of said interpolation scanning line generating means;

motion detecting means of detecting the motion amount of said interlaced input video signal, in which
  (a) the interlaced video signal is delayed by the time of two fields to provide a frame-delayed video signal,
  (b) the interlaced video signal is subtracted from the frame-delayed video signal to form a first value,
  (c) the interlaced video signal is delayed by the time of one field to provide a field-delayed video signal,
  (d) the field-delayed video signal is delayed by at least one scanning line to provide a line-delayed video signal,
  (e) the field-delayed video signal is subtracted from the line-delayed video signal to form a second value, and
  (f) the first value and the second value are provided to the amplitude control means; and flat portion detecting means of detecting a flat portion of said interlaced input video signal;

sequential scanning converter means of performing a conversion to a sequential scanning signal by using said interlaced input video signal and an output signal from said amplitude control means;

wherein said amplitude control means performs control according to an output signal of said flat portion detecting means.

5. A sequential scanning converter as set forth in claim 4, wherein said amplitude control means does not change the amplitude level of the output signal of said interpolation scanning line generating means if the flat portion amount from said flat portion detecting means is larger than a predetermined threshold.

6. A sequential scanning converter as set forth in claim 4, wherein said flat portion detecting means consists of a high-frequency extracting means for extracting the high-frequency component in the horizontal or vertical direction of said input video signal.

7. A sequential scanning converter as set forth in claim 6, wherein said high-frequency extracting means comprises:

a group of pixel delay means for delaying the pixels in the horizontal direction of said input video signal on a pixel basis, or a group of scanning line delay means for delaying the scanning lines in the vertical direction on a scanning line basis;

a first group of adder means for adding the output signals of said group of pixel delay means or said group of scanning line delay means;

a group of multiplier means for multiplying the output signals of said group of adder means by desired coefficients; and a second adder circuit for adding the outputs of said group of multiplier means.

8. A sequential scanning converter as set forth in claim 7, wherein said motion detecting means comprises:

a difference detecting means for detecting a difference by using an input video signal delayed by at least two fields;

a group of scanning line delay means for delaying the scanning lines in the vertical direction of said input video signal on a scanning line basis;

an edge detecting means for extracting the high-frequency component from the output signal of said group of scanning lie delay means; and an edge control means for controlling the motion amount according to the output signals of said difference detecting means and said edge detecting means, said group of scanning line delay means in said high-frequency extracting means and said group of scanning line delay means in said motion detecting means being made common.

9. A sequential scanning converter as set forth in claim 7, wherein said motion detecting means comprises:

a difference detecting means for detecting a difference by using an input video signal delayed by at least two fields;

a group of scanning line delay means for delaying the scanning lines in the vertical direction of said input video signal on a scanning line basis;

an edge detecting means for extracting the high-frequency component from the output signal of said group of scanning line delay means; and an edge control means for controlling the motion amount according to the output signals of said difference detecting means and said edge detecting means, said group of scanning line delay means in said high-frequency extracting means and said group of scanning line delay means in said motion detecting means being made common.

10. A display device comprising:

the sequential scanning converter described in claim 4;

a display panel for displaying the signal outputted from the sequential scanning converter; and a display control circuit for controlling the display.

11. A sequential scanning converter comprising:

interpolation scanning line generating means of generating interpolation scanning lines from an interlaced input video signal to provide an interpolated video signal;

amplitude control means of controlling the amplitude of the interpolated video signal of said interpolation scanning line generating means;

motion detecting means of detecting the motion amount of said interlaced input video signal, in which
  (a) the interlaced video signal is delayed by the time of two fields to provide a frame-delayed video signal,
  (b) the interlaced video signal is subtracted from the frame-delayed video signal to form a first value,
  (c) the interlaced video signal is delayed by the time of one field to provide a field-delayed video signal,
  (d) the field-delayed video signal is delayed by at least one scanning line to provide a line-delayed video signal,
  (e) the field-delayed video signal is subtracted from the line-delayed video signal to form a second value, and
  (f) the first value and the second value are provided to the amplitude control means; and flat portion detecting means of detecting a flat portion of said interlaced input video signal;

judging means of making a judgment with an output signal of said motion detecting means and an output signal of said flat portion detecting means; and sequential scanning converter means of performing a conversion to a sequential scanning signal by using said interlaced input video signal and an output signal from said amplitude control means;

wherein said amplitude control means performs control according to the output signals of said judging means.

12. A sequential scanning converter as set forth in claim 11, wherein said amplitude control means does not change the amplitude level of said interpolation scanning line generating means if said judging means judges that the motion amount from said motion detecting means is smaller than a first predetermined threshold and the flat portion amount from said flat portion detecting means is larger than a second predetermined threshold.

13. A sequential scanning converter as set forth in claim 11, wherein said flat portion detecting means consists of a high-frequency extracting means for extracting the high-frequency component in the horizontal or vertical direction of said input video signal.

14. A sequential scanning converter as set forth in claim 13, wherein said high-frequency extracting means comprises:

a group of pixel delay means for delaying the pixels in the horizontal direction of said input video signal on a pixel basis, or a group of scanning line delay means for delaying the scanning lines in the vertical direction on a scanning line basis;

a first group of adder means for adding the output signals of said group of pixel delay means or said group of scanning line delay means;

a group of multiplier means for multiplying the output signals of said group of adder means by desired coefficients; and a second adder circuit for adding the outputs of said group of multiplier means.

15. A display device comprising:

the sequential scanning converter described in claim 11;

a display panel for displaying the signal outputted from the sequential scanning converter; and a display control circuit for controlling the display.

16. A sequential scanning converter comprising:

an interpolation scanning line generating means for generating interpolation scanning lines from an input video signal;

an amplitude control means for controlling the amplitude of the output signal of said interpolation scanning line generating means;

a motion detecting means for detecting the motion amount of said input video signal;

a freeze-frame picture judging means for judging the freeze-frame picture within a field from the output signal of said motion detecting means;

a flat portion detecting means for detecting the flat portion of said input video signal;

a flat portion judging means for judging the flat portion within a field from the output signal of said flat portion detecting means;

a frequency judging means for detecting the freeze-frame picture for at least one field and the frequency of the flat portion from the output signal of said freeze-frame picture judging means and the output signal of said flat portion judging means; and a sequential scanning converter means for performing the conversion to a sequential scanning signal by using said input video signal and the output signal from said amplitude control means, wherein said amplitude control means performs control according to the output signal of said frequency judging means.

17. A sequential scanning converter as sat forth in claim 16, wherein said amplitude control means does not change the amplitude level of the output signal of said interpolation scanning line generating means if, in said frequency judging means, it is judged that the frequency of the freeze-frame picture for at least one field is equal to or larger than a specific value, and that the frequency of the flat portion for at least one field is equal to or larger than a specific value.

18. A sequential scanning converter as set forth in claim 16, wherein said flat portion detecting means consists of a high-frequency extracting means for extracting the high-frequency component in the horizontal or vertical direction of said input video signal.

19. A sequential scanning converter as set forth in claim 18, wherein said high-frequency extracting means comprises:

a group of pixel delay means for delaying the pixels in the horizontal direction of said input video signal on a pixel basis, or a group of scanning line delay means for delaying the scanning lines in the vertical direction on a scanning line basis;

a first group of adder means for adding the output signals of said group of pixel delay means or said group of scanning line delay means;

a group of multiplier means for multiplying the output signals of said group of adder means by desired coefficients; and a second adder circuit for adding the outputs of said group of multiplier means.

20. A sequential scanning converter as set forth in claim 19, wherein said motion detecting means comprises:

a difference detecting means for detecting a difference by using an input video signal delayed by at least two fields;

a group of scanning line delay means for delaying the scanning lines in the vertical direction of said input video signal on a scanning line basis;

an edge detecting means for extracting the high-frequency component from the output signal of said group of scanning line delay means; and an edge control means for controlling the motion amount according to the output signals of said difference detecting means and said edge detecting means, said group of scanning line delay means in said high-frequency extracting means and said group of scanning line delay means in said motion detecting means being made common.

21. A display device comprising:

the sequential scanning converter described in claim 16;

a display panel for displaying the signal outputted from the sequential scanning converter; and a display control circuit for controlling the display.

22. A method for converting an interlaced video signal to a sequential video signal comprising the steps of:

(a) interpolating scanning lines between adjacent scanning lines of the interlaced video signal to provide an interpolated video signal;

(b) delaying the interlaced video signal by the time of two fields to provide a frame-delayed video signal;

(c) subtracting the interlaced video signal from the frame-delayed video signal provided in step (b) to form a first value;
(d) delaying the interlaced video signal by the time of one field to provide a field-delayed video signal;
(e) delaying the field-delayed video signal by at least one scanning line to provide a line-delayed video signal;
(f) subtracting the field-delayed video signal from the line-delayed video signal provided in step (e) to form a second value;
(g) controlling an amplitude of the interpolated video signal using the first value of step (c) and the second value of step (f) to provide an amplitude controlled interpolated video signal; and
(h) multiplexing the amplitude controlled interpolated video signal and the interlaced video signal to form the sequential video signal.

23. A sequential scanning converter comprising:

interpolation scanning line generating means of generating interpolation scanning lines from an input video signal;

amplitude control means of controlling an amplitude of an output signal of said interpolation scanning line generating means;

motion detecting means of detecting a motion amount of said input video signal;

freeze-frame picture judging means of judging a freeze-frame picture within a field from an output signal of said motion detecting means;

flat portion detecting means of detecting a flat portion of said input video signal;

said flat portion detecting means including a high-frequency extracting means which extract a high-frequency component in a horizontal or vertical direction of said input video signal;

said high-frequency extracting means including:
  (i) a group of pixel delay means of delaying pixels in the horizontal direction of said input video signal on a pixel basis, or a group of said input video signal on a pixel basis, or a group of scanning line delay means of delaying scanning lines in the vertical direction on a scanning line basis,
  (ii) first group of adder means of adding output signals of said group of pixel delay means or said group of scanning line delay means,
  (iii) group of multiplier means of multiplying output signals of said first group of adder means by desired coefficients, and
  (iv) a second adder circuit for adding output signals of said group of multiplier means;

flat portion judging means of judging a flat portion within a field from an output signal of said flat portion detecting means;

frequency judging means of detecting a freeze-frame picture for at least one field and a frequency of a flat portion from an output signal of said freeze-frame picture judging means and an output signal of said flat portion judging means; and sequential scanning converter means of performing a conversion to a sequential scan by using said input video signal and an output signal from said amplitude control means, wherein said amplitude control means performs control according to an output signal of said frequency judging means.

* * * * *

UNITED STATES PATENT AND TRADEMARK OFFICE
CERTIFICATE OF CORRECTION

PATENT NO. : 6,259,480 B1
DATED : July 10, 2001
INVENTOR(S) : H. Yamauchi et al.

It is certified that error appears in the above-identified patent and that said Letters Patent is hereby corrected as shown below:

<u>Title page,</u>
Item [54], the title should read -- NON-INTERLACED SCANNING CONVERTER SYSTEM --.
Item [56], References Cited, foreign references should be added as follows:
-- 63-179685    7/23/98        JP
4-95479         3/27/92        JP --

Signed and Sealed this

Twentieth Day of August, 2002

Attest:

Attesting Officer

JAMES E. ROGAN
*Director of the United States Patent and Trademark Office*